US012578425B2

(12) United States Patent
Nam et al.

(10) Patent No.: US 12,578,425 B2
(45) Date of Patent: Mar. 17, 2026

(54) MIMO RADAR APPARATUS AND MIMO RADAR METHOD

(71) Applicant: Infineon Technologies AG, Neubiberg (DE)

(72) Inventors: Sang Ho Nam, Yongin-si (KR); Byung Kwon Park, Seongnam-si (KR)

(73) Assignee: Infineon Technologies AG, Neubiberg (DE)

( * ) Notice: Subject to any disclaimer, the term of this patent is extended or adjusted under 35 U.S.C. 154(b) by 323 days.

(21) Appl. No.: 18/184,350

(22) Filed: Mar. 15, 2023

(65) Prior Publication Data

US 2023/0305103 A1    Sep. 28, 2023

(30) Foreign Application Priority Data

Mar. 23, 2022    (DE) .......................... 102022106791.2

(51) Int. Cl.
*G01S 7/35* (2006.01)
*G01S 7/03* (2006.01)
*G01S 13/58* (2006.01)

(52) U.S. Cl.
CPC .................. G01S 7/35 (2013.01); G01S 7/03 (2013.01); G01S 7/356 (2021.05); G01S 13/584 (2013.01)

(58) Field of Classification Search
CPC ... G01S 7/35; G01S 7/356; G01S 7/03; G01S 13/584
See application file for complete search history.

(56) References Cited

U.S. PATENT DOCUMENTS

| | | | | |
|---|---|---|---|---|
| 11,372,097 B2 * | 6/2022 | Harrison | ............... | G01S 13/583 |
| 11,513,187 B2 * | 11/2022 | Stettiner | ............... | G01S 7/2883 |

(Continued)

FOREIGN PATENT DOCUMENTS

| | | |
|---|---|---|
| DE | 102020115333 A1 | 12/2020 |
| EP | 3929622 A1 | 12/2021 |

OTHER PUBLICATIONS

Nguyen et al, "Fast-Chirp FDMA MIMO Radar Systems Using Range-Division Multiple-Access and Multiple Doppler-Division Multiple Access", IEEE Transactions on Microwave Theory and Techniques, vol. 69, No. 1, Jan. 2021 (Year: 2021).*

(Continued)

*Primary Examiner* — Vladimir Magloire
*Assistant Examiner* — Kimberly Jenkins
(74) *Attorney, Agent, or Firm* — Harrity & Harrity, LLP

(57) ABSTRACT

The present disclosure relates to a MIMO radar apparatus, comprising a transmitter circuit configured to transmit, via a first transmit channel, a first sequence of FMCW radar chirps such that start and/or stop frequencies of each of at least a portion of the FMCW radar chirps of the first sequence are different from each other. The transmitter circuit is configured to transmit, via a second transmit channel, a second sequence of FMCW radar chirps, wherein start and/or stop frequencies of each of at least a portion of the FMCW radar chirps of the second sequence are different from each other. The first and the second sequence of FMCW radar chirps are transmitted concurrently. Control circuit is configured to control the first and second transmit channels to set phases of the FMCW radar chirps of the first sand second sequences in accordance with a predefined Doppler Division Multiplex scheme.

25 Claims, 11 Drawing Sheets

(56) References Cited

U.S. PATENT DOCUMENTS

| | | | | |
|---|---|---|---|---|
| 11,662,427 B2 * | 5/2023 | Wu | .......................... | G01S 7/354 |
| | | | | 342/194 |
| 11,762,077 B2 * | 9/2023 | Wu | ....................... | G01S 13/931 |
| | | | | 342/196 |
| 12,066,520 B2 * | 8/2024 | Wu | .......................... | G01S 7/288 |
| 12,146,949 B2 * | 11/2024 | Jácome Muñoz | .... | G01S 13/931 |
| 12,146,980 B2 * | 11/2024 | Gao | .......................... | G01S 13/22 |
| 12,204,046 B2 * | 1/2025 | Lee | ........................... | G01S 7/40 |
| 2020/0396688 A1 | 12/2020 | Hong et al. | | |
| 2021/0096234 A1 * | 4/2021 | Gulati | ................... | G01S 13/325 |
| 2021/0173069 A1 * | 6/2021 | Wu | ....................... | G01S 13/343 |
| 2021/0296783 A1 * | 9/2021 | Rostomyan | .......... | H01Q 1/2283 |
| 2021/0333386 A1 * | 10/2021 | Park | ........................ | G01S 7/356 |
| 2022/0187450 A1 * | 6/2022 | Vollbracht | ............ | G01S 7/4026 |
| 2023/0043829 A1 * | 2/2023 | Giere | ................... | G01S 13/343 |
| 2023/0129203 A1 * | 4/2023 | Park | ........................ | G01S 7/403 |
| | | | | 342/27 |

OTHER PUBLICATIONS

Sturm et al., "Automotive Fast-Chirp MIMO Radar with Simultaneous Transmission in a Doppler-Multiplex," The 19th International Radar Symposium IRS 2018, Jun. 20-22, 2018, Bonn, Germany, 6 Pages.
Gonzalez et al., "Doppler Ambiguity Resolution for Binary-Phase-Modulated MIMO FMCW Radars," 2019 International Radar Conference, 6 Pages.
Texas Instruments, "MIMO Radar," Application Report SWRA554A—May 2017—Revised Jul. 2018, 13 Pages.

* cited by examiner

Time division multiple access

Code division multiple access

> FMCW waveform

| Item | description | Relation |
|---|---|---|
| BW | waveform bandwidth | |
| $t_{dwell}$ | Time for data acquisition | |
| $t_R$ | Ramp repetition interval | |
| $R_N$ | Number of ramps | |
| fs | Sampling frequency | |
| $N_{samples}$ | Number of samples per each ramp | $t_{dwell}$*fs |
| $R_{res}$ | Range resolution | c/2/BW |
| $R_{max}$ | Unambiguous maximum detection range | c/2/BW*$N_{samples}$/2 |

710

TX 722-1

SOURCE

720

Power Splitter 722-2

722-3

Phase Shifter    712-1   TX1

Phase Shifter    712-2   TX2

Phase Shifter    712-3   TX3

RX

Power Splitter

ADC — Filter — MIXER    732-1    RX1

ADC — Filter — MIXER    732-2    RX2

ADC — Filter — MIXER    732-3    RX3

ADC — Filter — MIXER    732-4    RX4

730

750

752-$N_R$

Freq.

1   2   3   4   5    $N_R$ 752-1   752-2   752-3

Effective total BW

BW for each ramp $\Delta f$

Time

> Phase shifter configuration for each TX

|  | 1 | 2 | 3 | 4 | 5 | ... | $N_R$ |
|---|---|---|---|---|---|---|---|
| TX1 | 0 | 0 | 0 | 0 | 0 | ... | 0 |
| TX2 | 0 | 180 | 0 | 180 | 0 | ... | 180 |
| TX3 | 0 | 0 | 180 | 180 | 0 | ... | 180 |

FIG. 9

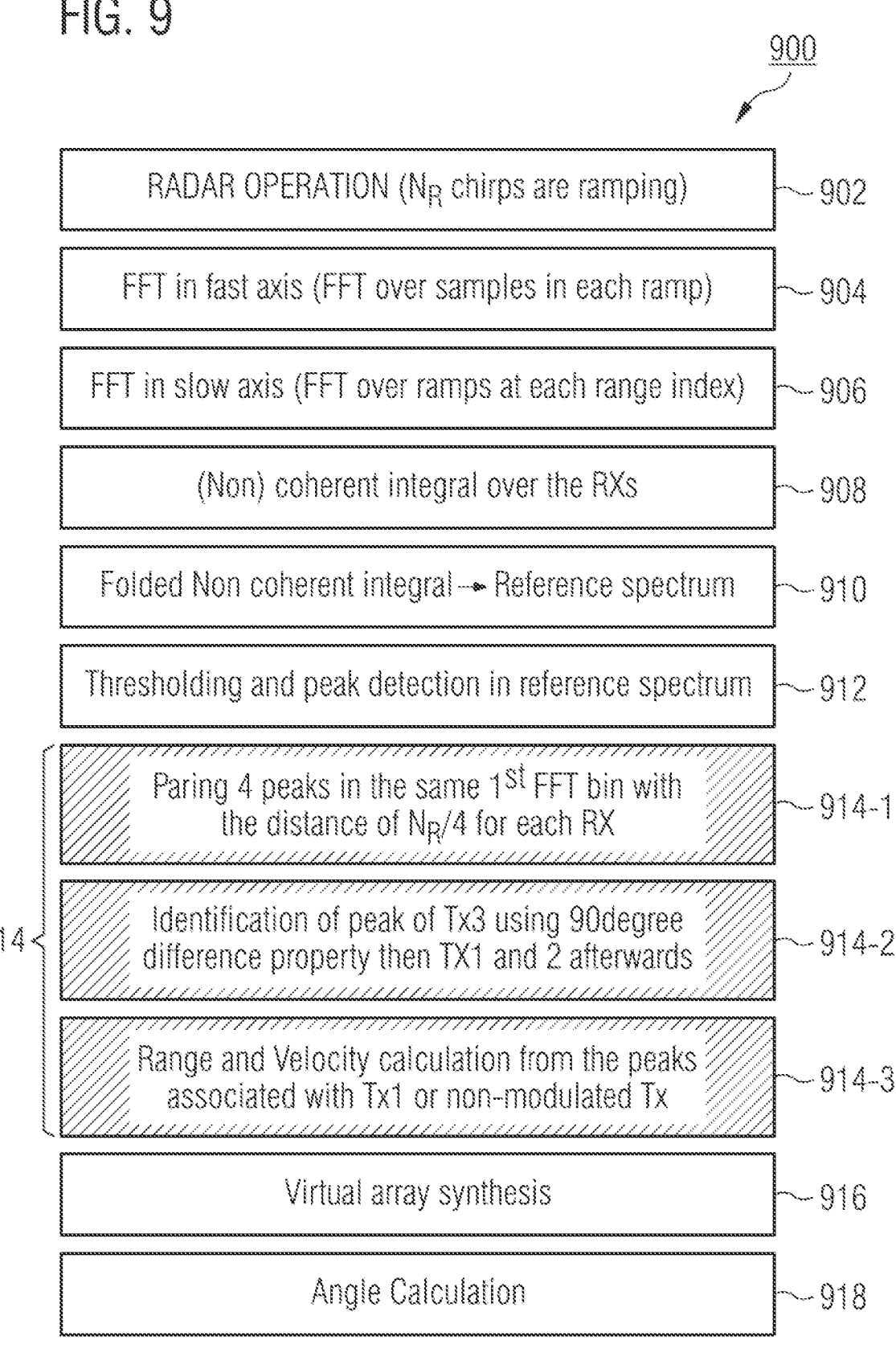

900

RADAR OPERATION ($N_R$ chirps are ramping) ~ 902

FFT in fast axis (FFT over samples in each ramp) ~ 904

FFT in slow axis (FFT over ramps at each range index) ~ 906

(Non) coherent integral over the RXs ~ 908

Folded Non coherent integral ⟶ Reference spectrum ~ 910

Thresholding and peak detection in reference spectrum ~ 912

914 {

Paring 4 peaks in the same $1^{st}$ FFT bin with the distance of $N_P/4$ for each RX ~ 914-1

Identification of peak of Tx3 using 90degree difference property then TX1 and 2 afterwards ~ 914-2

Range and Velocity calculation from the peaks associated with Tx1 or non-modulated Tx ~ 914-3

Virtual array synthesis ~ 916

Angle Calculation ~ 918

Slow frequency index

MIMO RADAR APPARATUS AND MIMO RADAR METHOD

CROSS REFERENCE TO RELATED APPLICATION

This application claims priority to German Patent Application No. 102022106791.2 filed on Mar. 23, 2022, the content of which is incorporated by reference herein in its entirety.

TECHNICAL FIELD

The present disclosure relates to radar systems and, more particularly, to MIMO (Multi Input Multi Output) radar concepts employing multiple transmit channels, one or multiple receive channels, and multiple waveforms.

BACKGROUND

Automotive radars, along with other environmental sensors such as lidar, ultrasound, and cameras, are one of the backbones of self-driving cars and advanced driver assistant systems (ADASs). These technological advancements are enabled by complex systems with signal processing paths from radars/sensors to one or more controllers. Automotive radar systems enable the detection of objects and obstacles, their position, and speed relative to a vehicle. The development of signal processing techniques along with progress in the millimeter-wave (mm-wave) semiconductor technology plays a key role in automotive radar systems. Various signal processing techniques have been developed to provide better resolution and estimation performance in all measurement dimensions: range, azimuth-elevation angles, and velocity of the targets surrounding the vehicles.

For frequency-modulated continuous-wave (FMCW) radar systems, for example, it is known to obtain information on range, speed, and angles by performing multiple Fast Fourier Transforms (FFTs) on samples of radar mixer outputs. A first FFT, also commonly referred to as range FFT, yields range information. A second FFT across the range transformed samples, also commonly referred to as Doppler FFT, yields speed information. The first and second FFTs yield a so-called 2D range-Doppler map comprising range and speed (FFT) bins. A third FFT involving phase information of signals of different antenna elements of an (virtual) antenna array can yield additional spatial or angular information—so-called Direction-of-Arrival (DoA) information.

MIMO (Multi Input Multi Output) is widely used to enlarge effective radar aperture size by synthesizing a virtual receiver array by combination of physically implemented multiple transmitter channels and multiple receiver channels. To synthesize virtual array information from limited physical arrays, separation of reflected signals received at each receiver channel from different transmitters is an important procedure in MIMO technology. A similar level of importance is on identification of corresponding transmitters of every reflected signal in each receiver channel.

Thus, there is a need for possibly large virtual array synthesis with high resolution and good identification of corresponding transmitters.

SUMMARY

This demand is met by MIMO radar devices and methods in accordance with the independent claims. Further beneficial implementations are addressed by the dependent claims.

According to a first aspect, the present disclosure proposes a MIMO radar apparatus. The MIMO radar apparatus comprises a transmitter circuit which includes a plurality of transmit channels. The transmitter circuit is configured to transmit, via a first transmit channel, a first sequence (or frame) of FMCW radar chirps (or ramps). Start and/or stop frequencies of each of at least a portion of the FMCW radar chirps of the first sequence are different from each other. Further, the transmitter circuit is configured to transmit, via a second transmit channel, a second sequence (or frame) of FMCW radar chirps. Start and/or stop frequencies of each of at least a portion of the FMCW radar chirps of the second sequence are different from each other. The transmitter circuit is configured to transmit the first and the second sequence of FMCW radar chirps concurrently (simultaneously). The MIMO radar apparatus further comprises a control circuit configured to control the first and second transmit channels to set phases of the FMCW radar chirps of the first sequence and the second sequence in accordance with a predefined Doppler Division Multiplex (DDM) scheme.

Conventionally, start and stop frequencies of each FMCW radar chirp within a chirp sequence are identical. Implementations of the present disclosure, however, propose varying start and/or stop frequencies within a chirp sequence. This may increase an effective modulation bandwidth to achieve higher range resolution with longer detectible range.

In DDM, the FMCW radar chirps concurrently transmitted by different transmit channels are modulated by different sequences of phases, so that the respective receive signals can be separated/decoded in a receiver based on the respective sequences of phases. In implementations, the respective phases of the FMCW radar chirps of the first sequence and the second sequence set in accordance with the DDM scheme may be maintained unchanged for a complete FMCW chirp period (interval), while for the following FMCW chirp period a respective new phase may be set in accordance with the DDM scheme and maintained unchanged for the complete FMCW chirp period, etc. Thus, the DDM scheme may be a chirp-wise DDM scheme where a transmit channel specific phase setting is maintained over the complete period of the FMCW chirp and may then be changed transmit channel specifically for the next chirp. DDM is sometimes also referred to as Code-Division-Multiplexing (CDM). The skilled person having benefit of the present disclosure will appreciate that implementations are not limited to first and second transmit channels. An arbitrary number of transmit channels is possible. In particular, some implementations propose three transmit channels.

In some implementations, the control circuit of the MIMO radar apparatus is configured to control the first and second transmit channels such that the respective FMCW radar chirps of the first and second sequence have an equal respective duration and/or an equal respective frequency bandwidth between the respective start and stop frequency. Thus, a FMCW radar chirp of the first sequence and a concurrently transmitted FMCW radar chirp of the second sequence may have equal duration and/or equal bandwidth. More particularly, a FMCW radar chirp of the first sequence and a concurrently transmitted FMCW radar chirp of the second sequence may have equal respective start and stop frequencies. In other words, the control circuit may be configured to control the first and second transmit channels to cause respective concurrent FMCW radar chirps of the first and second sequence have the same start and stop frequency. However, the respective start and stop frequencies may change within or during a sequence of FMCW radar chirps.

In some implementations, the control circuit is configured to control the first and second transmit channels such that the start frequencies of each subsequent pair of subsequent FMCW radar chirps of the first sequence differ by a predefined frequency offset and the start frequencies of each subsequent pair of subsequent FMCW radar chirps of the second sequence differ by the same predefined frequency offset. Thus, the start frequency of a subsequent FMCW radar chirp in each of the sequences may increase or decrease by the predefined frequency offset with respect to a preceding FMCW radar chirp. In other words, the control circuit may be configured to control the first and second transmit channels such that the start frequencies of each subsequent pair of subsequent FMCW radar chirps of the first and the second sequence increase or decrease by the predefined frequency offset. This may increase an effective frequency modulation bandwidth and thus the achievable range resolution.

In accordance with the predefined DDM scheme, the control circuit may be configured to assign, to each transmit channel, a unique sequence of phases applied to the respective sequence of FMCW chirps of the respective transmit channel. Thus, each transmit channel has its unique dedicated sequence of phases. On a receiver side, different transmit channels may then be identified based on the respective transmit channel specific sequences of phases. As has been explained before, a phase applied to a FMCW chirp may be understood as an initial phase offset that remains constant during the duration of the FMCW chirp. Phases (or phase offsets) of different FMCW chirps within a sequence of FMCW chirps may vary, however.

In some implementations, the control circuit is configured to select the phases for the predefined DDM scheme from an M-ary phase modulation alphabet, wherein M≥2 is an integer. This means that the different phases for the FMCW chirps may be chosen from a finite number of M alternative phases. Examples of modulation alphabets would be BPSK (Binary Phase Shift Keying), QPSK (Quaternary Phase Shift Keying), 8-PSK, and the like. In particular, BPSK may be useful. This may reduce ambiguities on the receiver side.

In some implementations, the control circuit is configured to assign a first predefined phase to the FMCW chirps of the first sequence. For example, the first predefined phase may be a constant phase of e.g., 0° or 180°, and may be applied to each FMCW chirp of the first sequence (e.g., no phase modulation of the first sequence of FMCW chirps). Further, the control circuit may be configured to assign the first phase and a different second phase to the FMCW chirps of the second sequence. If the first phase is 0°, the second phase may be 180°, for example. If the first phase is 180°, the second phase may be 0°, for example. A phase difference of 180° between the first and the second phase may be useful. For example, the first phase and the second phase may be assigned alternatingly to subsequent FMCW chirps of the second sequence (e.g., 0°|180°+0°+180°| . . . ). However, other phase patterns are also conceivable (e.g., 0°|0°|180°|180°|0°|0°|180°|180°| . . . ). Concurrently (simultaneously) transmitted FMCW chirps of the first and second sequence have predetermined phase differences. The predetermined phase differences may include a first and second predetermined phase difference. For example, the first predetermined phase difference may be 0° in case concurrently transmitted FMCW chirps of the first and second sequence both use the first phase. On the other hand, the second predetermined phase difference may be 180° in case concurrently transmitted FMCW chirps of the first and second sequence use different ones of the first and the second phase.

In some implementations, the control circuit is configured to assign the first phase to a first FMCW chirp of the second sequence and the second phase to a subsequent second FMCW chirp of the second sequence (e.g., 0°|180° . . . ), while two consecutive FMCW chirps of the first sequence are transmitted with the first phase (e.g., 0°|0°| . . . ). This corresponds to a consistent use of the first phase for FMCW chirps of the first sequence and an alternating use of the first and the second phase for FMCW chirps of the second sequence. In this way, the first and the second transmit channels may be identified and separated on a receiver side.

In some implementations, the control circuit is configured to assign a sequence of first phases to the first sequence of FMCW chirps. The first phases include either a first phase value (e.g., 0°) or a second phase value (e.g., 180°, wherein the first phase value and the second phase value differ by 180°. Only one of the first and the second phase may thus be applied to the first sequence of FMCW chirps. Further, control circuit may be configured to assign a sequence of second phases to the second sequence of FMCW chirps. The second phases include a third phase value (e.g., 0° or 45°) and a fourth phase value (e.g., 180° or 225°), wherein the third phase value and the fourth phase value differ by 180°. Only one of the first and the second phase value may thus be applied to the first sequence of FMCW chirps and both of the third and the fourth phase value may be applied to the second sequence of FMCW chirps. At least one of the first phase value and the second phase value may be different from each of the third and fourth phase value. Alternatively, at least one of the first or second phase values may be the same as the third phase value. Thus, the different transmit channels may employ different binary phase modulation alphabets, in some implementations.

In some implementations, the transmitter circuit of the MIMO radar apparatus additionally comprises a third transmit channel and is configured to transmit, via the third transmit channel, a third sequence of FMCW radar chirps such that start and/or stop frequencies of each of at least a portion of the FMCW radar chirps of the third sequence are different from each other. Thus, start and/or stop frequencies of the FMCW radar chirps of the third sequence may be changed similarly or identically to the start and/or stop frequencies of the FMCW radar chirps of the first and second sequences. The control circuit may be configured to assign a first phase (e.g., 0°) applied to each FMCW radar chirp of the first sequence. The control circuit may be configured to assign a sequence of second phases applied to the FMCW radar chirps of the second sequence, wherein the sequence of second phases comprises the first phase (e.g., 0°) and a different second phase (e.g., 180°) in a temporal order specific for the second transmit channel. First and second phase may differ by 180°. Further, the control circuit may be configured to assign a sequence of third phases applied to the FMCW radar chirps of the third sequence, wherein the sequence of third phases comprises the first phase (e.g., 0°) and the second phase (e.g., 180°) in a temporal order specific for the third transmit channel. The temporal order specific for the third transmit channel may be different from the temporal order specific for the second transmit channel. Thus, a binary DDM scheme may be employed for the three transmit channels. This may yield good performance with regards to identification of targets.

In some implementations, the control circuit is configured to assign, while two consecutive FMCW chirps of the first sequence are transmitted with the first phase (e.g., 0°|0°), the first phase to a first FMCW chirp of the second sequence and the second phase to a subsequent second FMCW chirp of the second sequence (e.g., 0°|180°). Further, the control circuit may be configured to assign, while four consecutive FMCW chirps of the first sequence are transmitted with the first phase (e.g., 0°|0°|0°|0°), the first phase to two consecutive FMCW radar chirps of the third sequence followed by the second phase assigned to two further consecutive FMCW radar chirps of the third sequence (e.g., 0°|0°|180°|180°).

In some implementations, the MIMO radar apparatus may further comprise a receiver circuit including at least one receiver channel. The at least one receiver channel is configured to receive a receive signal corresponding to reflections of the first sequence of FMCW radar chirps and the second sequence of FMCW radar chirps (and optionally of the third sequence of FMCW radar chirps). Thus, reflections of all concurrently transmitted sequences of FMCW radar chirps may superimpose at a receiver antenna. In some implementations, more than one receiver antenna (receiver channel) may be employed at the receiver side.

In some implementations, the receiver circuit is configured to perform a first FFT (range FFT) of the receive signal (receiver channel) to generate a plurality of first FFT bins (range bins). The receiver circuit may be further configured to perform a second FFT (Doppler FFT) using the first bins (range bins) to generate a plurality of second FFT bins (Doppler bins). The receiver circuit may be further configured to combine the first and the second bins to obtain, (per receive channel) a combined range-Doppler-map for the plurality of transmit channels. The combined range-Doppler-map comprises combined range-Doppler information related to all sequences of FMCW radar chirps from the different transmit channels. This combined range-Doppler information may be separated and associated with each of the transmit channels by taking the predefined DDM scheme into account.

In some implementations, the receiver circuit is configured to identify each of the transmit channels based on evaluating amplitudes and/or mutual distances of a plurality of second bins (Doppler bins) associated with the same first bin (range bin) of the combined range-Doppler-map. Thus, the different transmit channels may be identified based on distances between second FFT bins in which signal amplitudes exceed a certain threshold. For example, the DDM phase pattern of at least one of the transmit channels may cause target appearances in two second FFT bins (associated with the same first FFT bin) which are separated by a predefined bin distance corresponding to a predetermined phase difference. For example, the predetermined phase difference is 90° corresponding to a bin distance of $N_r/2$, wherein $N_r$ denotes a number of FMCW radar chirps within a sequence.

In some implementations, the receiver circuitry is configured to identify a first one of the plurality of transmit channels based on a pair of second bins having a mutual bin distance corresponding to a predetermined phase difference associated with the predefined Doppler Division Multiplex scheme, and to identify at least a second one of the plurality of transmit channels based on amplitudes of remaining second bins associated with the same first bin.

According to a further aspect, the present disclosure proposes a MIMO radar method. The method includes:

transmitting, via a first transmit channel, a first sequence of FMCW radar chirps such that start and/or stop frequencies of each of at least a portion of the FMCW radar chirps of the first sequence are different from each other, transmitting, via a second transmit channel, a second sequence of FMCW radar chirps, wherein start and/or stop frequencies of each of at least a portion of the FMCW radar chirps of the second sequence are different from each other, wherein the first and the second sequence of FMCW radar chirps are transmitted concurrently; and controlling the first and second transmit channels to set phases of the FMCW radar chirps of the first sequence and the second sequence in accordance with a predefined Doppler Division Multiplex scheme.

In some implementations, the start and stop frequencies of respective subsequent FMCW radar chirps of the first and the second sequence are increased or decreased by a predefined frequency offset.

BRIEF DESCRIPTION OF THE DRAWINGS

Some examples of apparatuses and/or methods will be described in the following by way of example only, and with reference to the accompanying FIGS., in which

in FIG. 2, a Figure index for the y axis is miles/hour while the x axis is in meters;

FIG. 9 shows a receiver process for a stepped DDM MIMO radar transmission concepts in accordance with implementations;

DETAILED DESCRIPTION

Various examples will now be described more fully with reference to the accompanying drawings in which some examples are illustrated. In the FIGS., the thicknesses of lines, layers and/or regions may be exaggerated for clarity.

Accordingly, while further examples are capable of various modifications and alternative forms, some particular examples thereof are shown in the FIGS. and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the FIGS., which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, e.g., only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
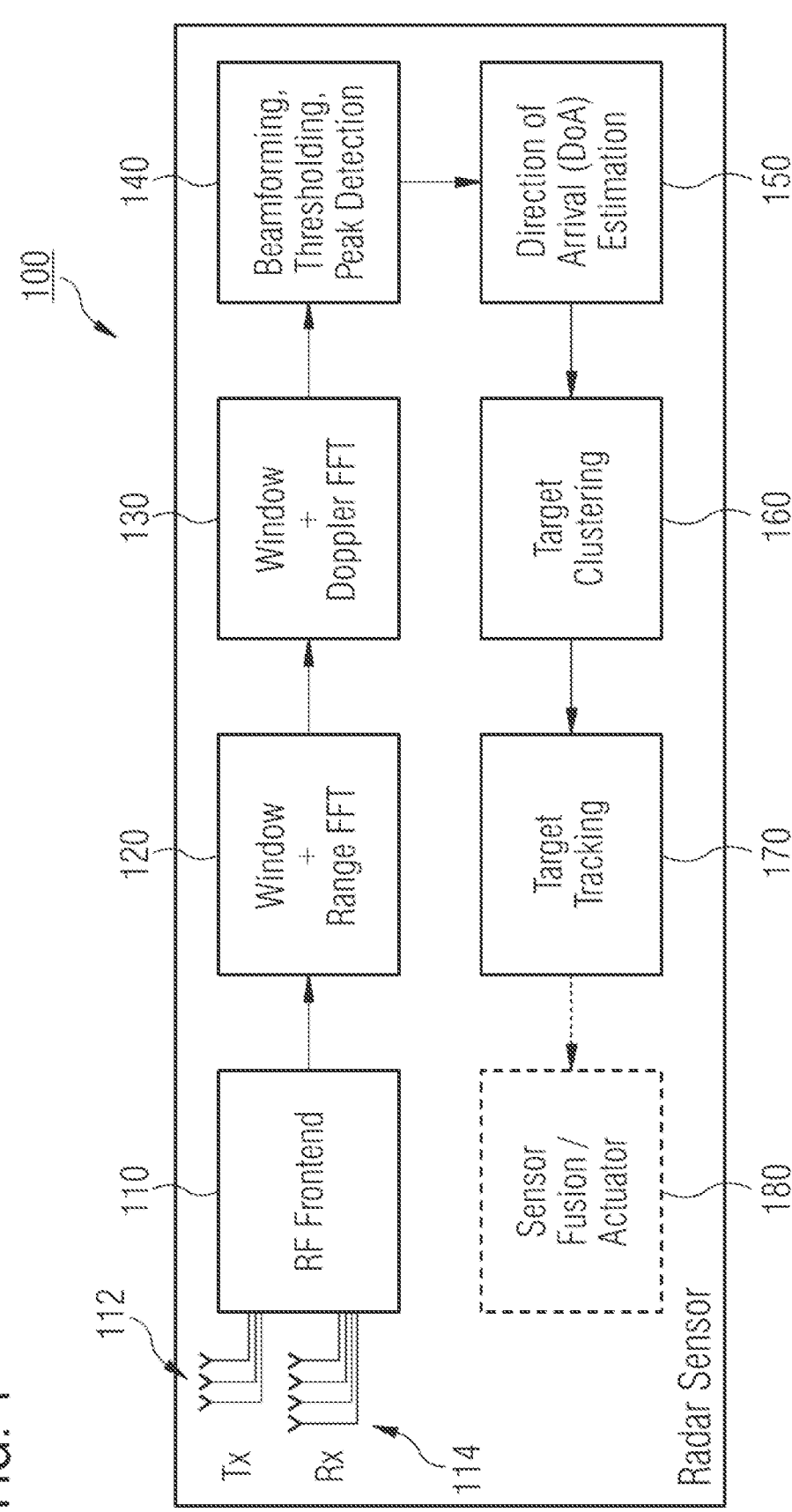
FIG. 1 shows a block diagram of a conventional radar signal processing chain.

FIG. 1 shows a block diagram of a conventional radar signal processing chain 100.

A Radio Frequency (RF) transceiver frontend 110 is used to generate transmit (Tx) radar signals that can be emitted via one or more transmit antennas 112. The radar signals can be in frequency bands ranging from 3 MHz to 300 GHz. Automotive radar systems typically operate at bands in 24 GHz and 77 GHz portions of the electromagnetic spectrum known as mm-wave frequencies so that adequate velocity and range resolution can be achieved. One or more receive (Rx) antennas 114 are used to receive electromagnetic waves (radar signals) reflected from targets. Radar operation involves range (distance), relative velocity, and possibly direction estimation. The latter can be done when using more than one receive antenna in an receive antenna array. Radar systems using both multiple transmit and multiple receive antennas are commonly referred to as MIMO radars. For proper transmit antenna spacing, the multiple-input multiple-output (MIMO) radar can emulate a larger aperture phased array radar. This larger array can be called a virtual array.

Figure 2:
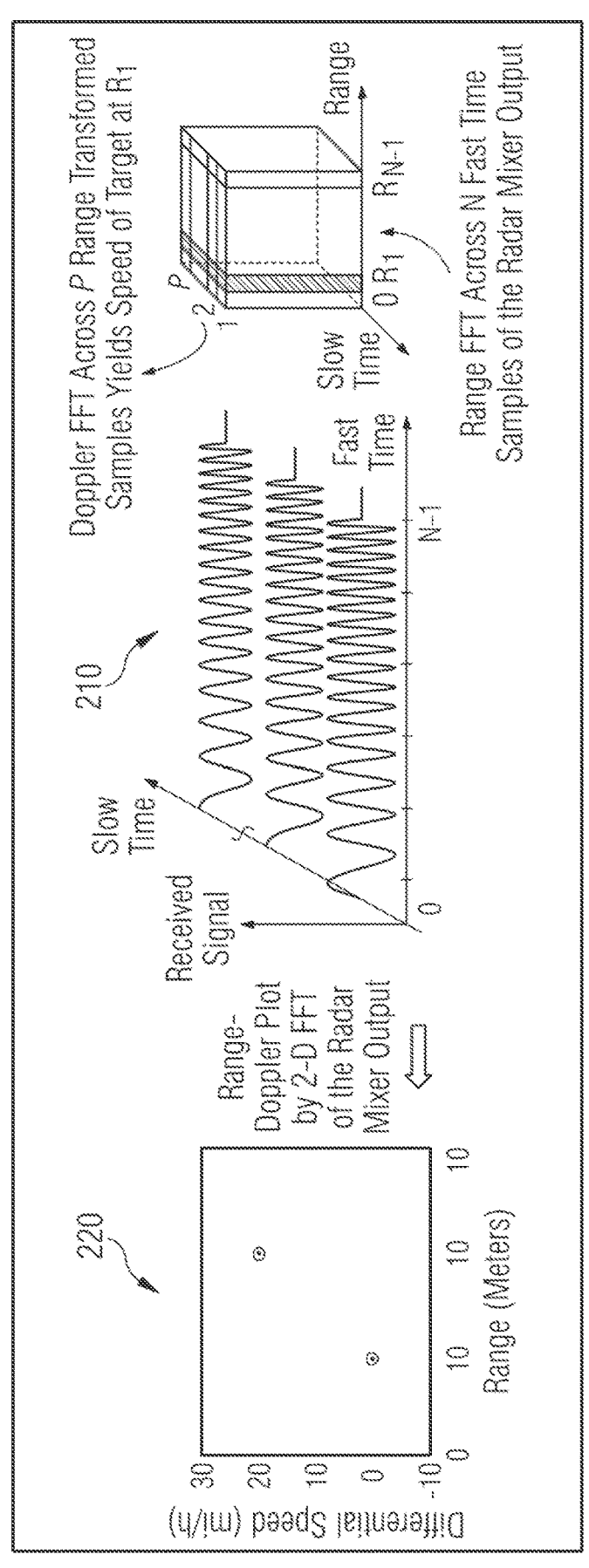
FIG. 2 shows a 2D joint range-Doppler estimation with FMCW radar.

A range processor 120 downstream from the RF transceiver frontend 110 is configured to perform range estimation. A range R to a target, can be determined based on the round-trip time delay that the electromagnetic waves take to propagate to and from that target: $R=(c\tau/2)$, where r is the round-trip time delay in seconds and c is the speed of light in meters per second. Thus, the estimation of r enables the range measurement. For example, pulse-modulated continuous waves (CWs) can comprise periodic and short power pulses and silent periods. Silent periods allow the radar to receive the reflected signals and serve as timing marks for radar to perform range estimation. With a pulsed radar configuration that uses frequency modulated (FM) CW pulses, simultaneous range-velocity estimation in multitarget traffic scenarios can be provided. A FMCW radar transmits periodic FM chirps (also referred to as pulses or ramps), whose frequency may increase linearly during the pulse. The receive signal reflected from a target is conjugately mixed with the transmit signal to produce a low-frequency beat signal (also referred to as baseband signal), whose frequency gives the range of the target. This operation can be repeated for P consecutive FMCW chirps. Two-dimensional (2D) waveforms 210 in FIG. 2 depict successive reflected chirps arranged across two time indices p, n. The so-called slow time index p simply corresponds to the chirp number. On the other hand, the so-called fast time index n assumes that for each chirp, the corresponding continuous beat signal is sampled with frequency $f_s$ to collect N samples within a chirp duration T.

The range processor 120 can be configured to perform a first discrete Fourier transform (e.g., FFT) across the fast time n to obtain beat frequency $f_b$ coupled with Doppler frequency $f_d$. This operation is also commonly known as range transform or range gating, which allows the estimation of Doppler shift corresponding to unique range gate or bin by the application of second Fourier transform (e.g., FFT) across the slow time. This can be done by speed processing element 130. Thus, a range-Doppler map 220 can be generated by using a 2D FFT, see FIG. 2. An example range-Doppler map 220 illustrated in FIG. 2 shows two targets, a first one at 10 m distance and 0 miles/hour relative speed, and a second one at 20 m distance at 20 mi/h relative speed. The targets can be subregions of interest of the range-Doppler map.

So far, it has been assumed that automotive radars only receive the reflection from the targets of interest, such as vehicles traveling in front. However, in addition to direct reflections from a target of interest, the radar also receives reflections from the road debris, guard rails, and walls, for example. This unwanted return at the radar is typically called clutter. The amount of clutter in the system changes as the surrounding environment of the vehicle varies. Hence, adaptive algorithms such as constant false alarm rate (CFAR) processing and space-time adaptive processing (STAP) can be used to mitigate the effect of clutter. To identify valid targets in the presence of clutter, a threshold for the target detection should be properly chosen. If the amplitude of the range-Doppler map at an estimated range is greater than some threshold, for example, the target can be said to be detected. Thus, the threshold should depend on the noise (e.g., clutter) in the given system. As clutter increases, a higher threshold may be chosen. A simple CFAR method based on cell or bin averaging can use a sliding window to derive the local clutter level by averaging multiple range bins. This described threshold selection and target (peak) detection is performed in processing block 140.

The use of wideband pulses, such as FMCW pulses, provides discrimination of targets in both distance and velocity. The discrimination in direction can be made using a multi-antenna array, such as in multi-antenna radar systems. Multi-antenna radar systems can employ multiple transmitters, multiple receivers, and multiple waveforms to exploit all available degrees of freedom. To spatially resolve targets and deliver comprehensive representation of the traffic scene, angular location of targets can be estimated. Therefore, in automotive radars, the location of a target can be described in terms of a spherical coordinate system $(R, \theta, \rho)$, where $(\theta, \rho)$ denote azimuthal and elevation angles, respectively. A single antenna radar setup is sufficient to provide a range-velocity map but insufficient to provide angle information since the measured time delay lacks the information in terms of angular locations of the targets. To enable direction estimation, the radar is configured to receive reflected waves with multiple antennas. For example, locating a target using electromagnetic waves in two dimensions requires the reflected wave data from the object to be collected in two distinct dimensions. These distinct dimensions can be formed in many ways using combinations of time, frequency, and space across receive antennas. For instance, a linear receive antenna array 114 and wideband waveforms such as FMCW form two unique dimensions. Additionally, smaller wavelengths in mm-wave bands correspond to smaller aperture sizes and, thus, many antenna elements can be densely packed into an antenna array. Hence, the effective radiation beam, which is stronger and sharper, in turn increases the resolution of angular measurements.

Figure 3:
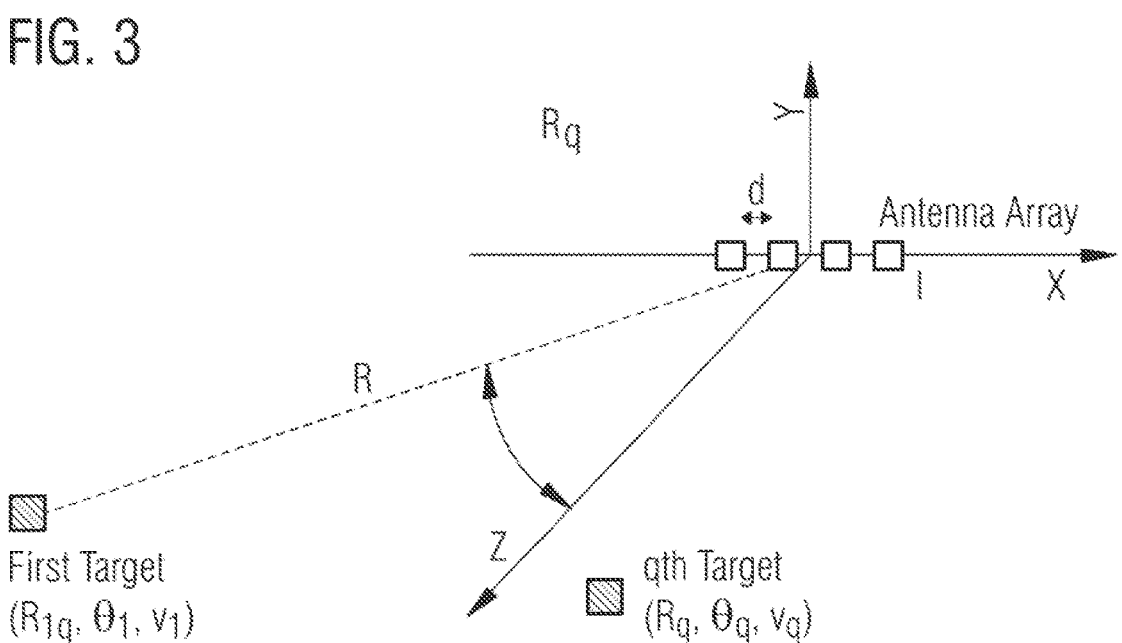
FIG. 3 illustrates azimuth angle estimation using a uniform linear antenna array.

Consider an antenna array located in plane z=0, and let l be the abscissa corresponding to each receiver antenna position, see FIG. 3. Let $(R_q, \theta_q)$ be the position of the q-th target in spherical coordinates, moving with velocity $v_q$ relative to the radar. With the help of far field approximation, for the q-th target, the round-trip time delay between a transmitter located at the origin and the receiver positioned at coordinate l can be expressed by $$\tau_{lq} = \frac{2(R_q + v_q t) + ld\sin\theta_q}{c},$$

where d is the distance between antenna elements (usually half the wavelength) arranged in a linear constellation. The delay term $\tau_{lg}$ creates uniform phase progression across antenna elements, which permits the estimation of the angle $\theta_q$ by FFT in spatial domain. Thus, 2D location (range and angle) and speed of targets can be estimated by a 3D FFT. The third angular FFT (Direction-of-Arrival, DoA, processing) is performed in processing block 150 of the example radar signal processing block diagram of FIG. 1.

Further conventional automotive radar processing can include target clustering 160, target tracking 170, and optional sensor fusion 180 with sensor data of other environmental sensor types (e.g., camera, lidar, etc.).

MIMO radar systems employ multiple transmitters, multiple receivers, and multiple waveforms to exploit all available degrees of freedom. MIMO radars can be classified as widely separated or co-located. In widely separated MIMO radar, transmit-receive antennas capture different aspects of the radar cross section (RCS) of a target. In other words, the target appears to be spatially distributed, providing a different RCS at each antenna element. This RCS diversity can be utilized to improve the radar performance. On the other hand, with co-located MIMO radar, the RCS observed by each antenna element is indistinguishable.

Figure 4:
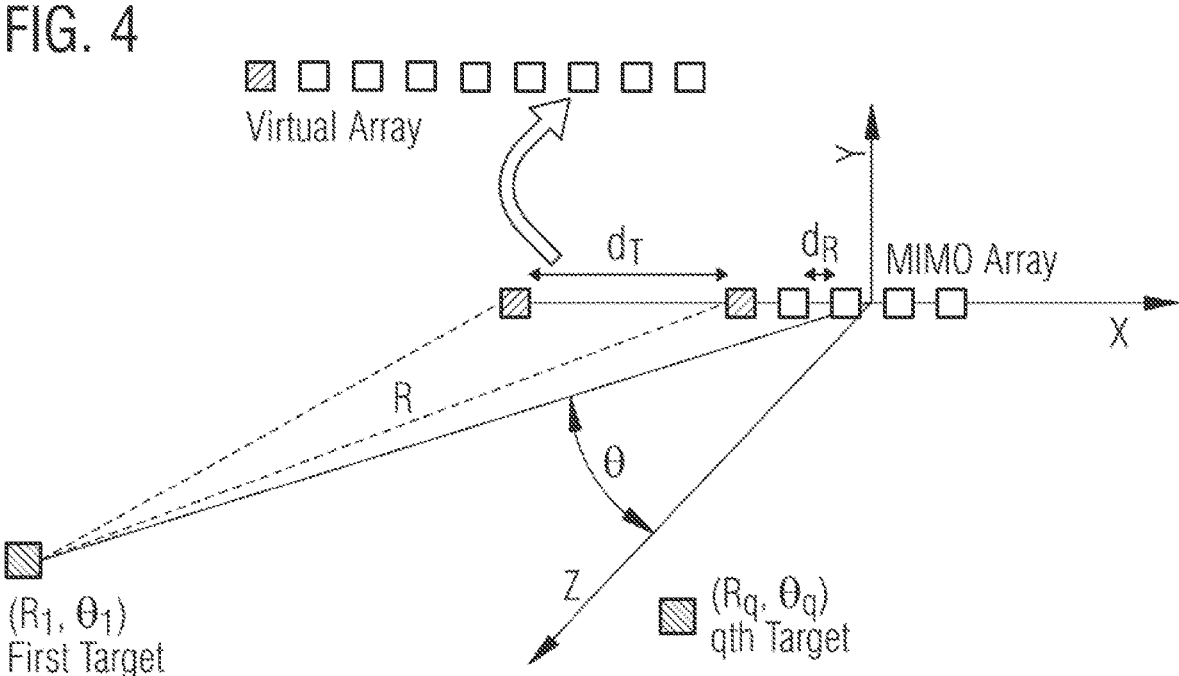
FIG. 4 illustrates a concept of virtual array synthesis.

Automobiles typically use co-located MIMO radars, which are compact in size. For proper transmitter spacing, the co-located MIMO radar can emulate a larger aperture phased array radar, see FIG. 4. This larger array is called a virtual array. For the MIMO radar processing, as depicted in FIG. 4, a 1-D receiver (Rx) array with two transmit (Tx)

antennas is considered. Let $N_T$ and $N_R$ denote a number of Tx and Rx antenna elements, respectively. Suppose that $d_T$ and $d_R$ represent corresponding Tx and Rx antenna spacings. Also, assume that Tx and Rx antenna positions in Cartesian coordinates are given by $l_T$ and $l_R$. Hence, the 2-D FMCW mixer output signal across fast time and aperture can be denoted as $$d(l_T, l_R, n) \approx$$

$$\sum_{q=0}^{Q-1} \alpha_q \exp\left\{j2\pi\left[\frac{2KR_q}{c}\frac{n}{f_s} + \frac{f_c\{(l_T d_T) + l_R d_R)\sin\theta_q\}}{c} + \frac{2f_c R_q}{c}\right]\right\} + \omega(l_r, l_R, n)$$

From above equation, it is evident that if $d_T = N_R \times d_R$, then MIMO radar imitates a regular 1-D array radar with a single Tx and $N_T \times N_R$ Rx antenna elements. This is known as virtual array representation. Hence, the spatial resolution of FFT-based target imaging can be improved by the factor of $N_T$.

A challenging aspect of MIMO radar is the selection of waveforms. The waveforms can be made orthogonal in frequency, time, or code domain, for example.

Figure 5A:
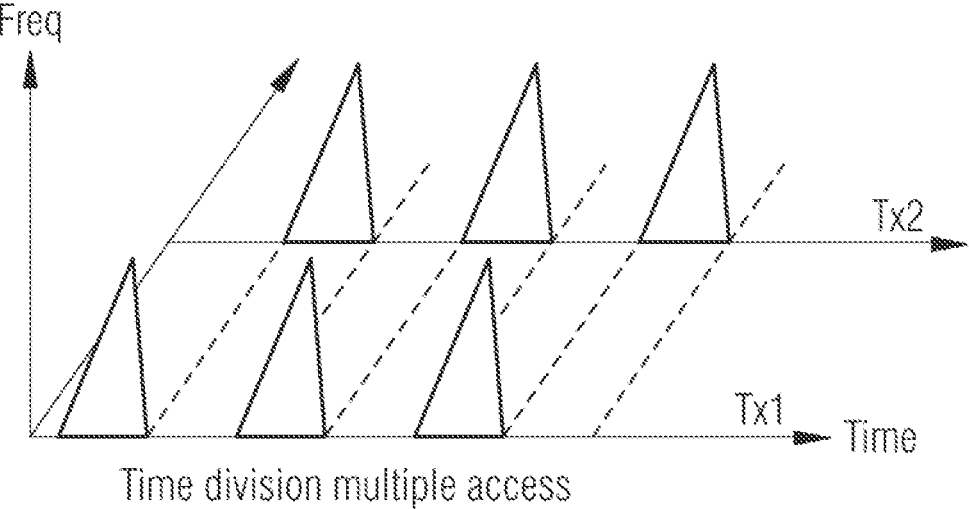
FIG. 5A shows a Time Division Multiple Access (TDMA) MIMO radar transmission method.

For a MIMO radar, to easily separate the signals transmitted by different Tx antennas (Tx channels), the most intuitive and simple way is alternative transmitting, e.g., each Tx channel transmits its own waveform alternatingly, and there is no overlap between any two transmissions. This is illustrated in FIG. 5A. This alternative transmitting Time Division Multiplexing (TDM) approach can achieve ideal orthogonality and the conventional radar waveform (e.g., chirp waveform) can be directly used in all transmitters. Though this alternative transmitting TDM approach is easy to use, it is evident that the transmission capabilities of all Tx antennas are not fully utilized. Compared with the MIMO radar in which all Tx antennas can transmit simultaneously, this alternative transmitting approach suffers from a loss of transmit power, which will give a shorter target detection range (Processing gain will be same or detection ranges are same, at the cost of Doppler unambiguity range reduction at TDM).

Figure 5B:
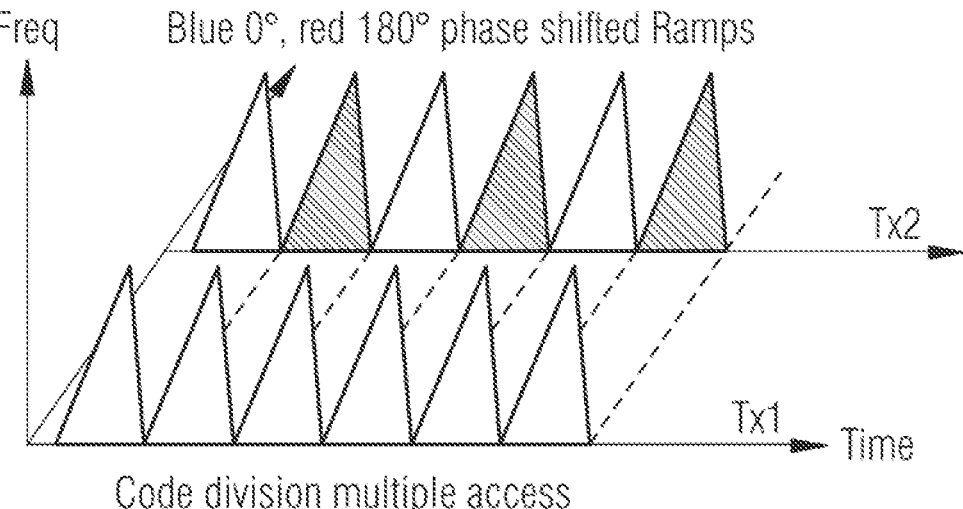
FIG. 5B shows a Code Division Multiple Access (CDMA) MIMO radar transmission method.

Doppler Division Multiplex (DDM) (also referred to as Code Division Multiplexing, CDM) MIMO waveform means the signals transmitted by different Tx channels are modulated by different series of phase codes, either in fast time or in slow time, so that these signals can be separated/decoded in a radar receiver. Since an ideal orthogonal code sequence with good auto- and cross-correlation properties does not exist, the DDM MIMO waveforms can just approximately satisfy the orthogonality requirement. In fast-time DDM (CDM) waveform, the phase codes are modulated by the carrier signal within each pulse/chirp. In slow-time DDM waveform, the phase codes are used to modulate the initial phases of different chirps. FIG. 5B illustrates an example of a slow-time DDM (CDM) waveform where chirps from transmit channel Tx1 and transmit channel Tx2 are transmitted concurrently. However, Tx2 applies a different phase code than Tx1. In the illustrated example, the initial phase of every second chirp of Tx2 is 180°, while Tx1 applies an initial phase of 0° for every chirp.

Figures 6A, 6B:
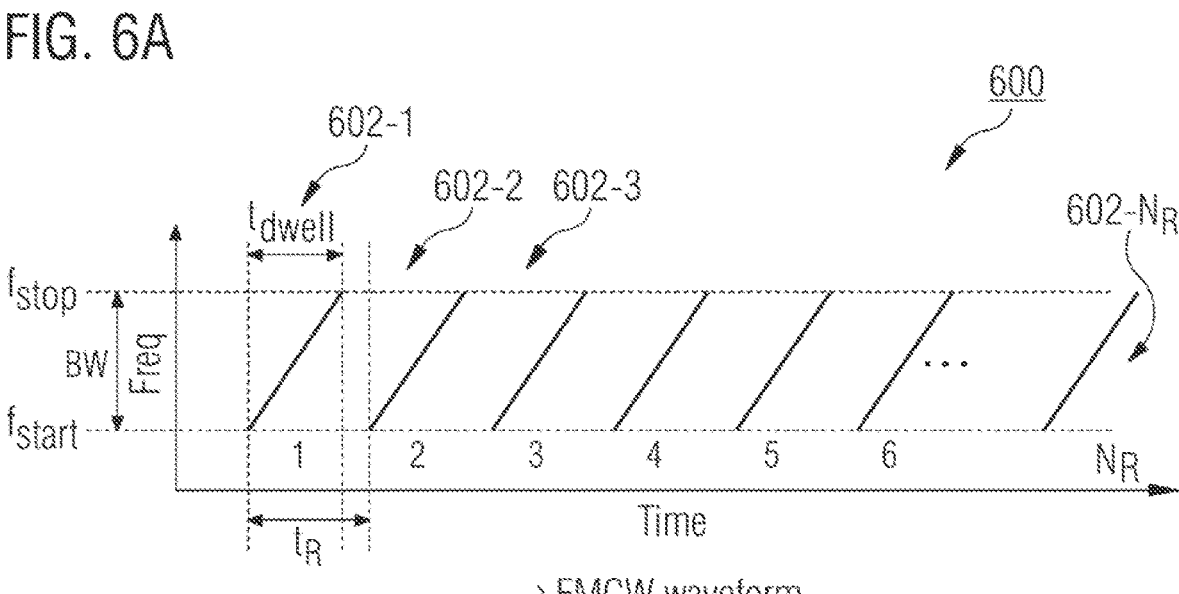
FIGS. 6A and 6B show a FMCW radar signal comprising a conventional sequence of FMCW radar chirps.

FIG. 6A illustrates a FMCW radar signal comprising a conventional sequence 600 of FMCW radar chirps 602.

The chirp sequence 600 includes a frame of $N_R$ FMCW radar chirps 602-1, 602-2, . . . , 602-$N_R$. Thus, the chirp sequence 600 includes $N_R$ FMCW radar chirps in the slow time domain. An example would be $N_R$=512. Each chirp 602 has a duration of $t_{dwell}$ includes a number of samples $N_{samples}$ (fast time). Thus, each chirp 602 includes $N_{samples}$ in the fast time domain. An example would be $N_{samples}$=1024. Given a sampling frequency $f_s$, the number of samples per each ramp is $N_{samples}$=$t_{dwell}*f_s$. An example would be $f_s$=25 MSPS. A chirp repetition interval is denoted by $t_R$>$t_{dwell}$, which is the time between the respective start instants of two consecutive chirps 602 within the sequence 600. The duration of the whole chirp sequence 600 is thus $t_R*N_R$. Each chirp 602 of the sequence 600 has the same start frequency $f_{start}$ and the same stop frequency $f_{stop}$. The difference between the stop frequency $f_{stop}$ and the start frequency $f_{start}$ denotes a waveform modulation bandwidth BW. An example would be BW=220.3 MHz.

As can be seen from the table in FIG. 6B, a range resolution $R_{res}$ of the conventional FMCW radar signal is dependent on the modulation bandwidth BW in accordance with $R_{res}$=c/2/BW, where c denotes the speed of light. This means that the range resolution $R_{res}$ is enhanced when BW is wide. The maximum detection range $R_{max}$ of the conventional FMCW radar signal is dependent on the bandwidth BW in accordance with $R_{max}$=c/2/BW*$N_{samples}$/2. This means that the maximum detection range $R_{max}$ is shorter when BW is wide. On the other hand, we get a poor range resolution $R_{res}$ in case of narrow BW but a longer maximum detection range $R_{max}$. Thus, $R_{max}$ and $R_{res}$ are in trade off relation.

The present disclosure proposes to increase an effective modulation bandwidth BW to achieve a higher range resolution $R_{res}$ for MIMO radar systems. This may be combined with a predefined DDM scheme in order to optimize time domain and frequency domain properties under limited spectrum resource.

Figures 7A, 7B:
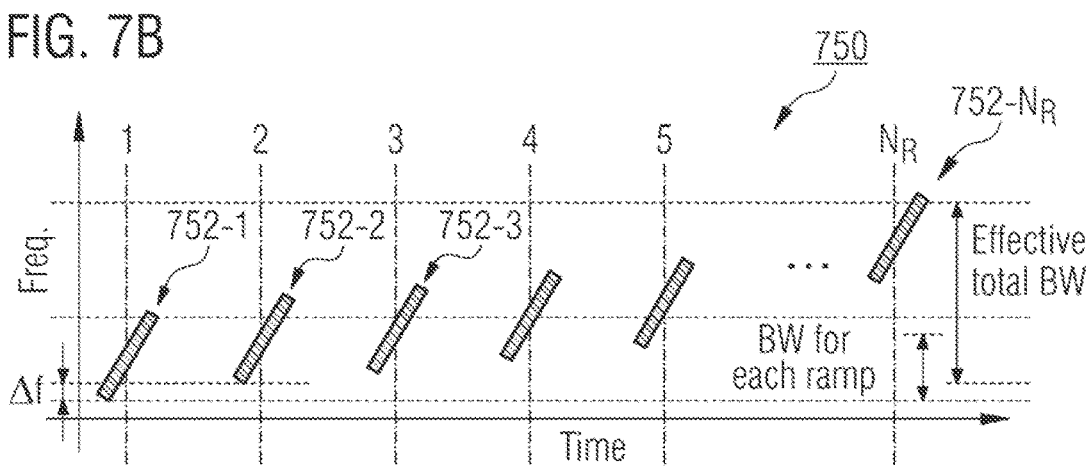
FIG. 7A shows a MIMO radar apparatus in accordance with implementations of the present disclosure.
FIG. 7B shows a FMCW radar signal comprising a stepped sequence of FMCW radar chirps in accordance with implementations of the present disclosure.

FIG. 7A illustrates a block diagram of a MIMO radar apparatus 700 in accordance with an implementation of the present disclosure.

MIMO radar apparatus 700 includes a transmitter circuit 710. Transmitter circuit 710 includes a plurality of Tx channels 712-1, 712-2, 712-3. Each Tx channel may include digital and/or analog hardware components, such as power splitters, phase shifters, power amplifiers, and Tx antennas. Although FIG. 7A illustrates an example of three Tx channels, the skilled person having benefit from the present disclosure will appreciate that the concept of increased effective modulation bandwidth BW described herein may also be applicable to less or more Tx channels.

The transmitter circuit 710 is configured to transmit, via a first Tx channel 712-1, a first sequence of FMCW radar chirps. In contrast to the conventional case described with regards to FIG. 6, start and/or stop frequencies of each of at least a portion of the FMCW radar chirps of the first chirp sequence are different from each other. Further, the transmitter circuit 710 is configured to transmit, via a second Tx channel 712-2, a second sequence of FMCW radar chirps. Again, start and/or stop frequencies of each of at least a portion of the FMCW radar chirps of the second chirp sequence are different from each other. It is to be noted that the first Tx channel 712-1 and the second Tx channel 712-2 are operated simultaneously. Thus, the first and the second sequence of FMCW radar chirps are transmitted concurrently. In other words, the FMCW radar chirps of the first and the second chirp sequence are transmitted concurrently.

As the first and the second sequence of FMCW radar chirps are transmitted concurrently, there is a need for separation of signals from the first Tx channel 712-1 and the second Tx channel 712-2 and the optional third Tx channel 712-3 at a receiving portion 730 of MIMO radar apparatus 700. As has been explained before, this can be achieved via Doppler Division Multiplexing (DDM). Doppler Division Multiple Access (DDMA) is an inter-chirp phase coding scheme ("slow-time" coding). In this configuration, the signal spectrum of each Tx channel is shifted slightly, so that the waveforms can be separated in Doppler domain.

For this purpose, MIMO radar apparatus 700 further comprises a control circuit 720 configured to control the first and second Tx channels 712-1, 712-2 (and the optional third Tx channel 712-3) to set phases of the FMCW radar chirps of the first sequence and the second sequence (and an optional third chirp sequence) in accordance with a predefined DDM scheme. As shown in FIG. 7A, the control circuit 720 may comprise respective analog or digital phase shifters 722-1, 722-2, and 722-3 for the respective Tx channels 712-1, 712-2, and 712-3.

MIMO radar apparatus 700 may optionally additionally comprise a receiver circuit 730 for receiving reflections of the transmitted FMCW radar signals. Receiver circuit 730 comprises at least one Rx channel 732. The at least one Rx channel 732 is configured to receive a receive signal corresponding to reflections of the first sequence of FMCW radar chirps, the second sequence of FMCW radar chirps, and an optional third sequence of FMCW radar chirps of the optional third Tx channel 712-3. In the illustrated example, receiver circuit 730 does not only comprise one Rx channel 732, but four Rx channels 732-1, . . . , 732-4 for improved signal-to-noise ratio (SNR) and improved angular resolution. Receiver circuit 730 will be explained in more detail further below. The skilled person having benefit from the present disclosure will appreciate that transmitter circuit 710 and receiver circuit 730 may be integrated or implemented separately and may include digital and analog circuit components used in FMCW radar transceivers, including but not limited to, for example, baseband circuits, mixer stages, RF circuits, Digital-to-Analog Converters (DACs), Analog-to-Digital Converters (ADCs), amplifiers, antennas, and the like.

A sequence 750 of $N_R$ FMCW radar chirps 752 in accordance with an implementation of the present disclosure is illustrated in FIG. 7B. The illustrated FMCW sequence may be referred to as stepped FMCW sequence.

In the illustrated example of FIG. 7B, not only start and/or stop frequencies of some of the FMCW radar chirps 752 of the sequence 750 are different from each other. Start and stop frequencies of each of the consecutive $N_R$ FMCW radar chirps 752 of the sequence 750 are different from each other. In the illustrated example, control circuit 720 is configured to control the first Tx channel 712-1 such that the start frequencies of each subsequent pair of subsequent FMCW radar chirps 752 of the first sequence 750 differ by a predefined frequency offset Δf. Likewise, control circuit 720 is configured to control the second Tx channel 712-2 such that the start frequencies of each subsequent pair of subsequent FMCW radar chirps 752 of the second sequence 750 differ by the same predefined frequency offset Δf. In case of a third Tx channel 712-3, control circuit 720 is configured to control the third Tx channel 712-3 such that the start frequencies of each subsequent pair of subsequent FMCW radar chirps 752 of the third sequence 750 differ by the same predefined frequency offset Δf. In the illustrated example, control circuit 720 is configured to control the respective Tx channels 712-1, . . . , 712-3 such that the start frequency of each subsequent FMCW radar chirp 752-n (n=2, . . . , $N_R$) of the respective chirp sequence 750 increases by the predefined frequency offset Δf vis-à-vis its preceding FMCW radar chirp 752-(n−1). Thus, the start frequency $f_{start,n}$ of the n-th (n=2, . . . , $N_R$) FMCW radar chirp 752-*n* of the respective chirp sequence is $f_{start,n}=f_{start,1}+(n-1)\cdot\Delta f$, wherein $f_{start,1}$ denotes the start frequency of the initial chirp 752-1 of the respective chirp sequence. Likewise, the stop frequency $f_{stop,n}$ of the n-th (n=2, . . . , $N_R$) FMCW radar chirp 752-*n* of the respective chirp sequence is $f_{stop,n}=f_{stop,1}+(n-1)\cdot\Delta f$, wherein $f_{start,1}$ denotes the stop frequency of the initial chirp 752-1 of the respective chirp sequence.

In the illustrated example of the stepped FMCW chirp sequence 750 of FIG. 7B, it is assumed that the duration $t_{dwell}$ the bandwidth BW for each chirp 752-*n* (n=1, . . . , $N_R$) of the sequence 750 is identical. Thus, with an increase of the start frequencies between each subsequent pair of subsequent FMCW radar chirps 752 by predefined frequency offset $\Delta f$ an increase of an effective total bandwidth BW of the sequence 750 may be obtained compared to the conventional case of FIG. 6. The increase of the effective total bandwidth BW may be $(N_R-1)*\Delta f$ compared to the conventional case of FIG. 6. The stepped FMCW chirp sequences of all Tx channels 712-1, 712-2, 712-3 may be identical and transmitted concurrently. This means that all $N_R$ chirps of the different stepped FMCW radar chirp sequences of the different Tx channels may be transmitted concurrently and with the same increasing respective start and stop frequencies.

In the illustrated example, the start frequency increments by $\Delta f$ per each chirp 752 within the chirp sequence 750. The number of samples $N_{samples}$ and other conditions may be the same as with the conventional FMCW waveform of FIG. 6. The larger effective total bandwidth BW of the resulting stepped FMCW waveform may lead to an increased range resolution. However, $R_{max}$ may stay the same if the actual BW per chirp 752 does not change.

The skilled person having benefit from the present disclosure will appreciate that the start frequency could as well decrement by $\Delta f$ per each chirp 752 within a chirp sequence. In other examples, the start frequency could increment or decrement only every second chirp within a chirp sequence. Numerous variations are conceivable to achieve a larger effective total bandwidth BW of the chirp sequence compared to the conventional case. Implementations are not limited to the chirp sequence 750 of the example of FIG. 7B.

According to the present disclosure, the stepped FMCW waveforms or sequences of the plurality of Tx channels 712-1, . . . , 712-3 may be combined with a predefined DDM scheme for Tx channel separation at the receiving side. For this purpose, the control circuit 720 (including respective phase shifters 722) may be configured to assign, to each Tx channel 712-1, 712-2, and 712-3, a unique sequence of phases applied to the respective sequence of FMCW chirps of the respective Tx channel. The phases for the respective unique sequence of phases for each Tx channel may generally be selected from an M-ary phase modulation alphabet, wherein M≥2 is an integer. M=2 would mean a binary phase modulation alphabet, for example with phases 0° and 180°, or 45° and 225°, or 90° and 270°, etc. M=4 would mean a quaternary phase modulation alphabet, for example with phases 0°, 90°, 180°, and 270°. The higher M, the more Tx channels may be separated. A sequence of phases applied to a chirp sequence may also be referred to as phase modulation vector.

In an implementation, three Tx channels 712-1, 712-2, and 712-3 may be separated by using a DDM scheme with a binary phase modulation alphabet (e.g., M=2). An example of the DDM scheme for the respective chirp sequences of the three Tx channels 712-1, 712-2, and 712-3 is illustrated in FIGS. 8A and 8B.

Figures 8A, 8B:
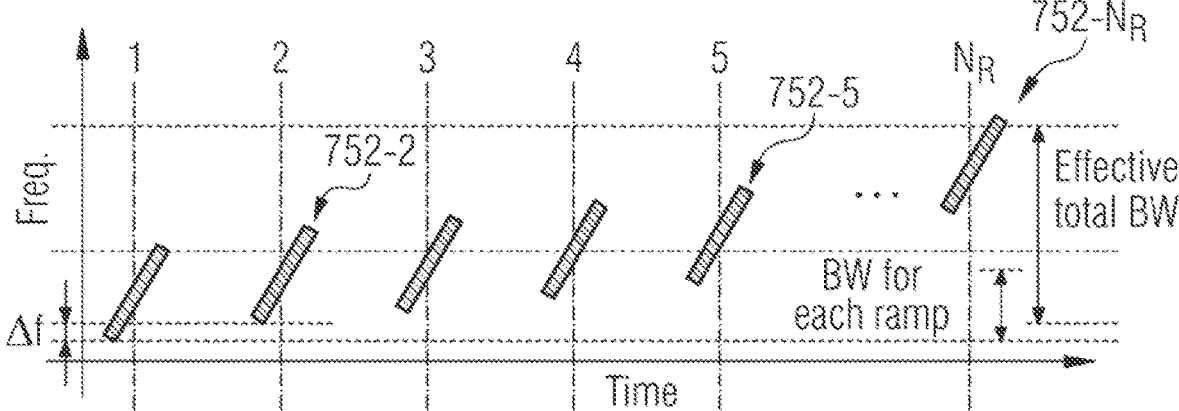
FIG. 8A illustrates a FMCW radar signal comprising a stepped sequence of FMCW radar chirps in accordance with implementations of the present disclosure.
FIG. 8B illustrates phased modulation vectors for different transmit channels in accordance with implementations of the present disclosure.

FIG. 8A repeats the frequency stepped FMCW chirp sequence 750 which is concurrently transmitted from all Tx channels 712-1, 712-2, and 712-3. The respective sequences of FMCW radar chirps each comprise $N_R$ chirps, wherein a chirp start frequency is increased by $\Delta f$ chirp by chirp while individual chirp bandwidths BW remain unchanged (constant) throughout the respective sequences. The achievable range resolution therefore improves to $$R_{res}=c/(2*BW*\Delta f*(N_R-1)).\qquad\qquad 1.$$

FIG. 8B illustrates an example configuration of the respective phase shifters 722-1, 722-2, and 722-3 for the Tx channels 712-1, 712-2, and 712-3. The control circuit 720 is configured to assign a (single) first phase $\varphi_1$ to the FMCW chirps of the first chirp sequence of the first Tx channel 712-1 (Tx1). In the illustrated example, the first phase $\varphi_1$ is 0°. All $N_R$ stepped FMCW chirps 752-*n* (n=1, . . . , $N_R$) of the first chirp sequence are transmitted with the first phase $\varphi_1$. The 1×$N_R$ phase modulation vector for the first Tx channel 712-1 (Tx1) may thus be [$\varphi_1$, $\varphi_1$, $\varphi_1$, $\varphi_1$, . . . , $\varphi_1$, $\varphi_1$].

The control circuit 720 is further configured to assign the first phase $\varphi_1$ and a second phase $\varphi_2$ to the FMCW chirps of the second sequence of the second Tx channel 712-2 (Tx2). In the illustrated example of FIG. 8B, the second phase $\varphi_2$ is 180°. A temporal order of the first phase $\varphi_1$ and the second phase $\varphi_2$ is specific for the second Tx channel 712-2. For example, every odd numbered FMCW chirp of the second chirp sequence is transmitted with the first phase $\varphi_1$. Every even numbered FMCW chirp of the second chirp sequence is transmitted with the second phase $\varphi_2$. This may also be vice versa. Therefore, concurrently transmitted FMCW chirps of the first and second sequence have predetermined phase differences comprising a first predetermined phase difference $\Delta\varphi_1$ and second predetermined phase difference $\Delta\varphi_2$. In the illustrated example, the first predetermined phase difference $\Delta\varphi_1$ is 0° and the second predetermined phase difference $\Delta\varphi_2$ is 180°. However, also other first and second predetermined phase differences $\Delta\varphi_1$, $\Delta\varphi_2$ are possible in other implementations. The 1×$N_R$ phase modulation vector for the second Tx channel 712-2 (Tx2) may thus be [$\varphi_1$, $\varphi_2$, $\varphi_1$, $\varphi_2$, . . . , $\varphi_1$, $\varphi_2$].

The control circuit 720 is further configured to assign the first phase $\varphi_1$ and the second phase $\varphi_2$ to the FMCW chirps of the third sequence of the third Tx channel 712-3 (Tx3). Also here a temporal order of the first phase $\varphi_1$ and the second phase $\varphi_2$ is specific for the third Tx channel 712-3 and different from the temporal order of the first phase and the second phase for the second Tx channel 712-2. For example, the first and the second FMCW chirp of the third chirp sequence are transmitted with the first phase $\varphi_1$. The third and the fourth FMCW chirp of the third chirp sequence are transmitted with the second phase $\varphi_2$. The fifth and the sixth FMCW chirp of the third chirp sequence are transmitted with the first phase $\varphi_1$. The seventh and the eighth FMCW chirp of the third chirp sequence are transmitted with the second phase $\varphi_2$, and so on. The 1×$N_R$ phase modulation vector for the third Tx channel 712-3 (Tx3) may thus be [$\varphi_1$, $\varphi_1$, $\varphi_2$, $\varphi_2$, $\varphi_1$, $\varphi_1$, $\varphi_2$, $\varphi_2$, . . . , $\varphi_1$, $\varphi_1$, $\varphi_2$, $\varphi_2$].

In the illustrated example of FIG. 8B, the control circuit 720 is configured to assign, while two consecutive FMCW chirps of the first sequence are transmitted with the first phase $\varphi_1$ (0°, the first phase $\varphi_1$(0°) to a first FMCW chirp of the second sequence and the second phase $\varphi_2$(180°) to a subsequent second FMCW chirp of the second sequence. Further, the control circuit 720 is configured to assign, while four consecutive FMCW chirps of the first sequence are transmitted with the first phase $\varphi_1$ (0°), the first phase $\varphi_1$(0°) to two consecutive FMCW radar chirps of the third sequence followed by the second phase $\varphi_2$(180°) assigned to two further consecutive FMCW radar chirps of the third sequence.

The skilled person having benefit from the present disclosure will appreciate that that the first phase $\varphi_1$ does not need to be 0°. Instead, it could be an arbitrary phase value $\varphi$. Then, the second phase $\varphi_2$ could be chosen to $\varphi+180°$, for example. However, a phase difference between the first and second phase does not necessarily have to be 180°. Other values are possible as well.

As mentioned before, the MIMO radar apparatus 700 shown in FIG. 7 may also comprise a (monostatic or bistatic) receiver circuit 730 for receiving reflections of the transmitted DDM MIMO waveforms. Receiver circuit 730 comprises at least one Rx channel 732-1 (including an Rx antenna and analog and digital Rx circuits). Typically, receiver circuit 730 will comprise a plurality of Rx channels 732-1, 732-2, . . . , 732-$N_{Rx}$. In the illustrated example, $N_{Rx}$=4, leading to a virtual array of 12 antenna elements. For high resolution radars, e.g., a combination of $N_{Tx}$=3 Tx channels and $N_{Rx}$=16 Rx channels would be conceivable, leading to a virtual array of 48 antenna elements.

Receiver circuit 730 is configured to receive, via Rx channel 732-$n$ ($n$=1, . . . , $N_{Rx}$), a respective Rx signal corresponding to a superposition of reflections of the first sequence of FMCW radar chirps (from Tx1), the second sequence of FMCW radar chirps (from Tx2), and the third sequence of FMCW radar chirps (from Tx3). The following reception procedure will be described for one Rx channel 732. This can be applied, however, to a plurality of Rx channels for virtual array synthesis.

As shown in the example Rx process 900 of FIG. 9, a respective range FFT (over fast time) can be performed (see 904) after Analog-to-Digital Conversion (ADC) (see 902) of the received radar signal. That is to say, in act 904 receiver circuit 730 may be configured to perform (for each Rx channel) a range FFT (over fast time) of the respective receive signal to generate a plurality of range bins associated with the respective Rx channel and the plurality of Tx channels. Range FFTs are generally known to the skilled person having benefit from the present disclosure.

After the range bins have been generated by the range FFT, a Doppler FFT (over slow time) can be performed using the previously obtained range bins to generate a plurality of Doppler bins comprising velocity information (see act 906). Doppler FFTs are generally known to the skilled person having benefit from the present disclosure. After having performed the Doppler FFT, a combined 2D range-Doppler map data for the plurality of Tx channels (Tx1-Tx3) is available. A respective combined 2D range-Doppler map may be obtained for each Rx channel.

If more than one Rx channel is used, a probability of detection can be enhanced by summing or integrating the 2D range-Doppler map data of all Rx channels. For example, a non-coherent integration (NCI) of the available range-Doppler maps can be performed (see act 908). To obtain a reference 2D range-Doppler map, adaptive thresholding and peak detection algorithms such as Constant False Alarm Rate (CFAR) processing or Space-Time Adaptive Processing (STAP) can be used to mitigate the effect of clutter (see 910, 912). The remaining peaks (above a certain signal threshold) in the reference 2D range-Doppler map may identify targets and indicate a respective target's distance (R) from the MIMO radar apparatus 700.

Note that the Doppler bins associated with a range bin of the reference 2D range-Doppler map may still be ambiguous due to the predefined DDM scheme. Range information, however, may be unambiguous. In order to get unambiguous Doppler (e.g., velocity) information from the reference 2D range-Doppler map, the receiver circuit 730 may be configured to identify each of the Tx channels (Tx1, Tx2, Tx3) based on evaluating amplitudes and/or mutual distances of a plurality of Doppler bins (peaks) associated with the same range bin of the reference 2D range-Doppler map for each Rx channel. This may be done in act 914, which may be subdivided into acts 914-1, 914-2, and 914-3.

Figure 10:
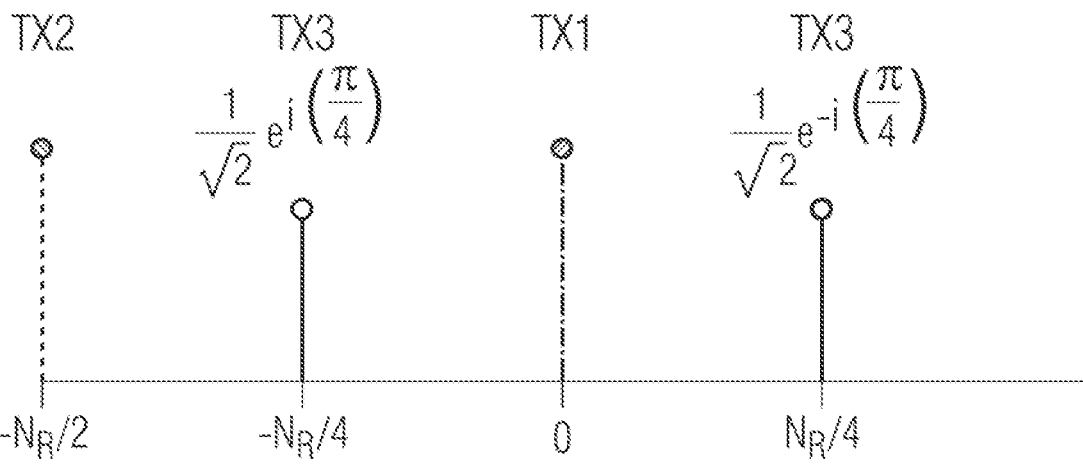
FIG. 10 illustrate the effect of DDM MIMO radar transmission on a Doppler spectrum.

FIG. 10 illustrates phase modulation effects according to the different phase modulation vectors used for the different Tx channels 712-1, 712-2, 712-3 (Tx1, Tx2, Tx3).

FIG. 10 shows a phase shifting effect in Doppler FFT associated with a phase distance between elements of phase modulation vectors. As a result of the (initial) phase modulation of a FMCW chirp sequence in a Tx channel, original frequency indexes (bins) of Doppler FFT from scatters are shifted according to a phase shift effect shown in FIG. 10. For example, if three Tx channels are used with different example phase modulation vectors shown in FIG. 8B, four different frequency indices (bins) appear after a Doppler FFT from the same range FFT bin. A bin distance between the Doppler bins depends on the modulation vectors of the Tx channels.

In the illustrated example, (slow) frequency index 0 corresponds to phase modulation vector of Tx channel Tx1=[0°, 0°, 0°, 0°, 0°, 0°, 0°, 0°]. Here, the phase distance between adjacent elements of the modulation vector is 0°. (Slow) frequency index $-N_R/2$ corresponds to phase modulation vector of Tx channel Tx2=[0°, 180°, 0°, 180°, 0°, 180°, 0°, 180°]. Here, the phase distance between adjacent elements of the modulation vector is 180°. (Slow) frequency indices $\pm N_R/4$ correspond to phase modulation vector of Tx channel Tx3=[0°, 0°, 180°, 180°, 0°, 0°, 180°, 180°]. Here, the (average) phase distance between adjacent elements of the modulation vector is 90°.

It can be seen from FIG. 10, that peaks in Doppler bins of Tx1, Tx2, and Tx 3 (associated with the same range bin) whose values are above a threshold level, called CFAR threshold, appear within a (slow) frequency index window from $-N_R/2$ to $N_R/4$. If range bin index is denoted as Find and Doppler bin index of the leftmost peak as Sind, the bin positions of the peaks in an Rx channel specific range-Doppler map may be described as

| | |
|---|---|
| $(F_{ind}, S_{ind})$ | $SNAP_{RX(i)\_P1}$ |
| $(F_{ind}, \mathrm{mod}(S_{ind} + 1*N_R/4))$, | $SNAP_{RX(i)\_P2}$ |
| $(F_{ind}, \mathrm{mod}(S_{ind} + 1*2N_R/4))$, | $SNAP_{RX(i)\_P3}$ |
| $(F_{ind}, \mathrm{mod}(S_{ind} + 1*3N_R/4))$ | $SNAP_{RX(i)\_P4}$. |

Here, RX(i) denotes the i-th Rx channel.

Thus, the Doppler bin window size in which peaks corresponding to Tx1, Tx2, and Tx3 may be expected is $3N_r/4$ in the illustrated example. Each pair of the peaks in the Doppler bin window has a bin distance of $N_R/4$. Thus, DDM synthesis 914 may comprise an act 914-1 of identifying the Doppler bin window by pairing peaks in four Doppler bins associated with the same range bin with Doppler bin distance of $N_R/4$ between adjacent peaks. Act 914-1 will yield peak Doppler signals corresponding to Tx channels Tx1, Tx2, and Tx 3.

Then, DDM synthesis 914 may comprise an act 914-2 of identifying Tx channel Tx3 based on evaluating peak amplitudes and mutual distances of the four previously identified Doppler bins associated with the same range bin which are located in the Doppler bin window from $-N_v/2$ to $N_v/4$. As can be seen from FIG. 10, the third Tx channel Tx3 with phase modulation vector [0°, 0°, 180°, 180°, 0°, 0°, 180°, 180°] causes two peaks in two Doppler bins $\pm N_v/4$ which are spaced $N_R/2$ Doppler bins apart. A peak amplitude for the Doppler bins $\pm N_v/4$ (Tx3) is lower (1/sqrt(2)) than those of the Doppler bins 0 (Tx1) and $-N_v/2$ (Tx2). Thus, if Doppler bins among the four Doppler bins associated with the same range bin are spaced $N_v/2$ bins apart and have a phase difference of 90°, these Doppler bins may be identified as belonging to the third Tx channel Tx3 with phase modulation vector [0°, 0°, 180°, 180°, 0°, 0°, 180°, 180°]. Optionally, the lower amplitude of the Doppler bins may additionally be used to identify the third Tx channel Tx3. After having identified Tx channel Tx3, DDM synthesis 914 may comprise identifying Tx channels Tx1 and Tx2 in act 914-2 based on relative positions of the remaining Doppler bins (peaks) and/or their amplitudes. For example, a peak centered between the Doppler bins associated with Tx channel Tx3 may be associated with (unmodulated) Tx channel Tx1. The remaining fourth peak at $-N_R/2$ then belongs to Tx channel Tx2. Thus, receiver circuit 730 may be configured to identify a first one (e.g., Tx3) of the plurality of Tx channels based on a pair of Doppler bins having a predetermined bin distance (e.g., $N_R/2$) and a predetermined phase difference (e.g., 90°) associated with the predefined DDM scheme. Their amplitudes may be lower than Doppler bins corresponding to other Tx channels (e.g., Tx1, Tx2). At least a second one of the plurality of Tx channels may be identified based on positions of remaining Doppler bins associated with the same range bin relative to the bin positions of the firstly identified pair of Doppler bins. The remaining Doppler bins may have higher amplitudes than the remaining Doppler bins. The skilled person having benefit from the present disclosure will appreciate that the Doppler bin window and the positions of bins within the window may vary depending on the employed phase modulation vectors.

Under a (different) assumption that peaks $\text{SNAP}_{RX(i)\_P1}$ and $\text{SNAP}_{RX(i)\_P3}$ correspond to Tx channel Tx3, $\text{SNAP}_{RX(i)\_P2}$ corresponds to Tx channel Tx1, and $\text{SNAP}_{RX(i)\_P4}$ corresponds to Tx channel Tx2, Tx channel identification for all Rx channels RX(1) to RX(4) may be implemented according to the following pseudo code:

| Pseudo code for TX identification |
|---|
| CP1 = 0 |
| CP2 = 0 |
| CP3 = 0 |
| CP4 = 0 |
| Repeat 4 (RX(1) to RX(4)) |
|     CP1 = CP1 + (angle(($\text{SNAP}_{RX(i)\_P1}$) * conj($\text{SNAP}_{RX(i)\_P3}$) ) – pi/2 ) |
|     CP2 = CP2 + (angle(($\text{SNAP}_{RX(i)\_P2}$) * conj($\text{SNAP}_{RX(i)\_P4}$) ) – pi/2 ) |
|     CP3 = CP3 + (angle(($\text{SNAP}_{RX(i)\_P3}$) * conj($\text{SNAP}_{RX(i)\_P1}$) ) – pi/2 ) |
|     CP4 = CP4 +(angle(($\text{SNAP}_{RX(i)\_P4}$) * conj($\text{SNAP}_{RX(i)\_P2}$) ) – pi/2 ) |
| Find minimum among CP1, CP2, CP3, CP4 |
| if minimum value is CP1, |
|     Target from TX3 in RX(i) |
|       $\text{SNAP}_{RX(i)\_P1}$ + $\text{SNAP}_{RX(i)\_P3}$ |
|     Target from TX1 in RX(i) |
|       $\text{SNAP}_{RX(i)\_P2}$ |
|     Target from TX2 in RX(i) |
|       $\text{SNAP}_{RX(i)\_P4}$ |

After all Tx channels Tx1, Tx2, Tx3 have been identified, DDM synthesis 914 may comprise an act 914-3 of determining range and velocity for all Tx channels Tx1, Tx2, Tx3 from the peak(s) associated with the non-modulated Tx channel (here: Tx1).

In act 916, a virtual array synthesis can be performed by combining the results of the previous acts for all Rx channels. In this way, range-Doppler map data for every Tx-Rx channel pair may be generated.

With the results obtained so far, angle calculation 918 can be performed by DoA (direction of arrival) processing over the virtual array including each Tx-Rx channel pair. DoA processing can be done by performing a $3^{rd}$ FFT (angular FFT) across all antennas of a virtual array. Here, phase information of the detected peaks in the range-Doppler maps may be used.

Figure 11A:
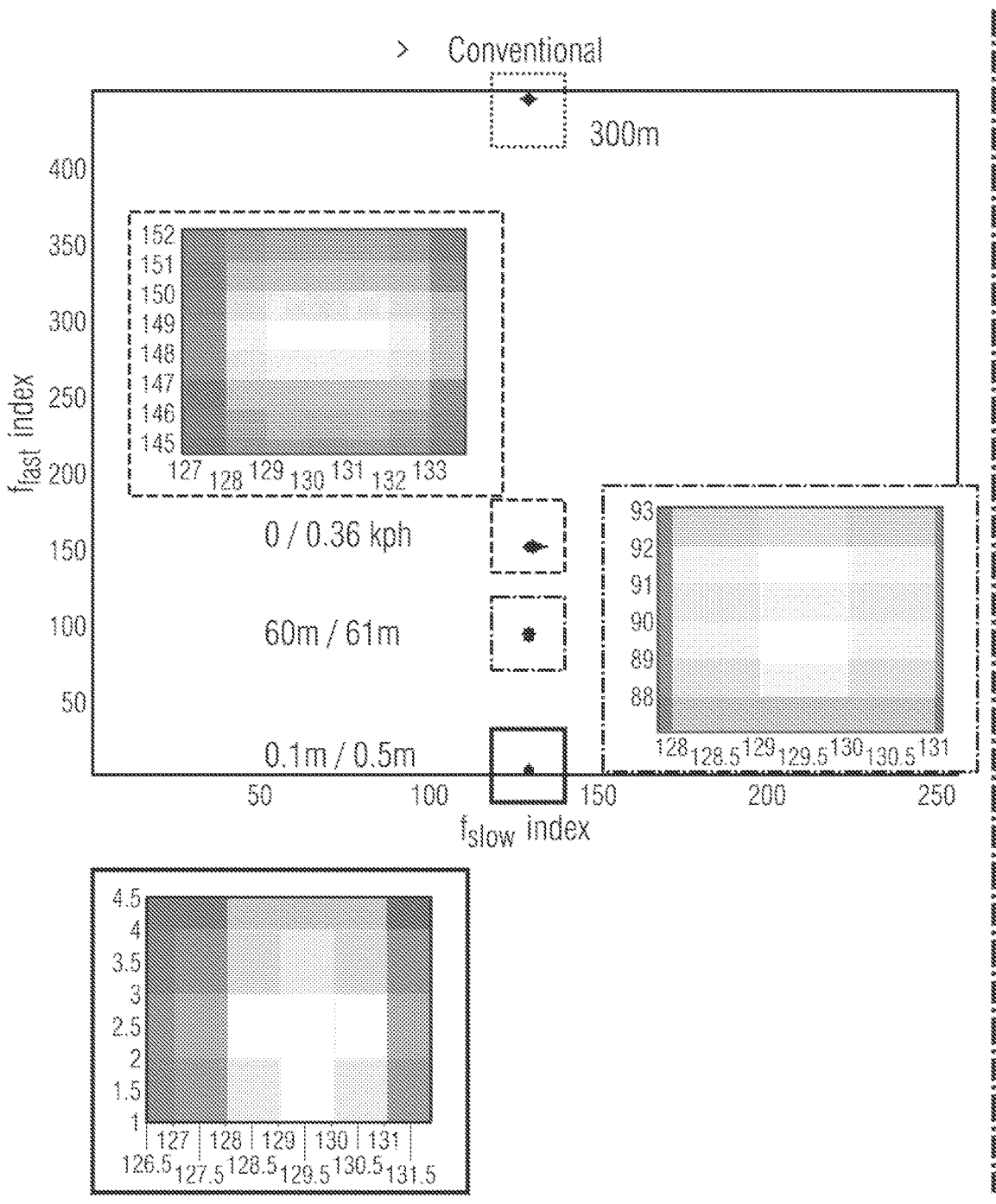
FIGS. 11A and 11B illustrate improved range resolution achievable with the proposed stepped sequence of FMCW radar chirps.
Figure 11B:
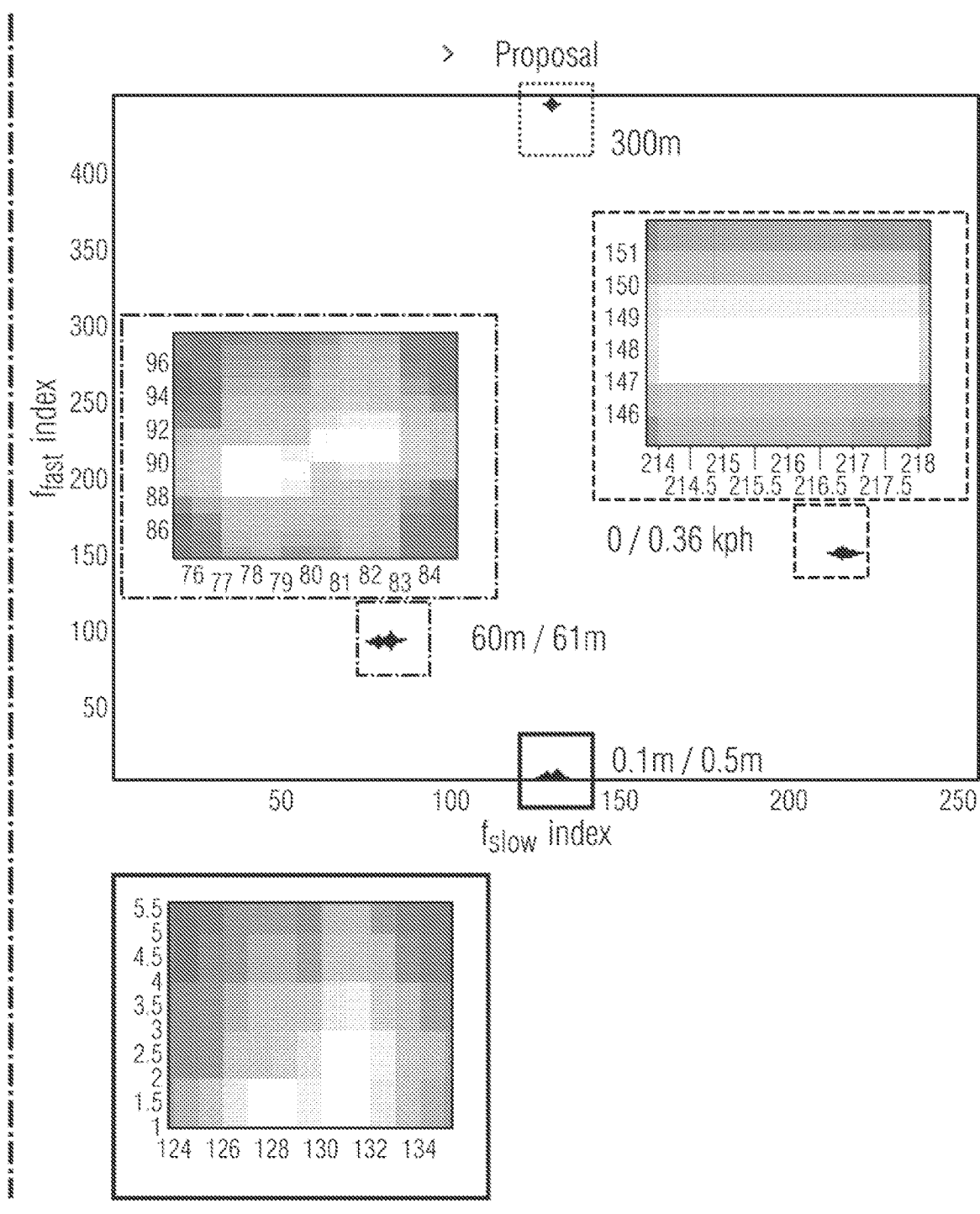

As shown in FIGS. 11A and 11B, implementations may achieve an improved range resolution, enabling the identification of distinct targets where conventional solutions could not distinguish targets. The range resolution of implementations may be $R_{res}=c/(2*BW*\Delta f*(N_R-1))$, while conventional range resolution is $R_{res}=c/(2*BW)$.

Aspects

The aspects and features mentioned and described together with one or more of the previously detailed aspects and FIGS., may as well be combined with one or more of the other aspects in order to replace a like feature of the other example or in order to additionally introduce the feature to the other example.

Aspects may further be or relate to a computer program having a program code for performing one or more of the above methods, when the computer program is executed on a computer or processor. Steps, operations or processes of various above-described methods may be performed by programmed computers or processors. Aspects may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may include or be, for instance, digital memories, magnetic storage media such as magnetic disks and magnetic tapes, hard drives, or optically readable digital data storage media. Further aspects may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all aspects recited herein are principally intended expressly to be only for illustrative purposes to aid the reader in understanding the principles of the disclosure and the concepts contributed by the inventor(s) to furthering the art. All statements herein reciting principles, aspects, and aspects of the disclosure, as well as specific aspects thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the FIGS., including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some aspects a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other aspects may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A multi input multi output (MIMO) radar apparatus, comprising:
a transmitter circuit comprising a plurality of transmit channels;
wherein the transmitter circuit is configured to:
transmit, via a first transmit channel of the plurality of transmit channels, a first sequence of frequency-modulated continuous-wave (FMCW) radar chirps such that one or more of a start frequency or a stop frequency of each of at least a portion of the first sequence of FMCW radar chirps are different from each other, and
transmit, via a second transmit channel of the plurality of transmit channels, a second sequence of FMCW radar chirps,
wherein one or more of a start frequency or a stop frequency of each of at least a portion of the second sequence of FMCW radar chirps are different from each other, and
wherein the first sequence of FMCW radar chirps and the second sequence of FMCW radar chirps are transmitted concurrently; and
a control circuit configured to control the first transmit channel and the second transmit channel to set phases of the first sequence of FMCW radar chirps and the second sequence of FMCW radar chirps in accordance with a predefined Doppler division multiplex scheme.

2. The MIMO radar apparatus of claim 1, wherein the control circuit is configured to control the first transmit channel and the second transmit channel such that respective FMCW radar chirps of the first sequence of FMCW radar chirps and the second sequence of FMCW radar chirps comprise at least one of:
an equal respective duration, or
an equal respective bandwidth between a respective start frequency and a respective stop frequency.

3. The MIMO radar apparatus of claim 1, wherein the control circuit is configured to control the first transmit channel and the second transmit channel such that the start frequencies of each subsequent pair of subsequent FMCW radar chirps of the first sequence of FMCW radar chirps differ by a predefined frequency offset and the start frequencies of each subsequent pair of subsequent FMCW radar chirps of the second sequence of FMCW radar chirps differ by the predefined frequency offset.

4. The MIMO radar apparatus of claim 3, wherein the control circuit is configured to control the first transmit channel and the second transmit channel such that the start frequencies of each subsequent pair of subsequent FMCW radar chirps of the first sequence of FMCW radar chirps and the second sequence of FMCW radar chirps increase or decrease by the predefined frequency offset.

5. The MIMO radar apparatus of claim 1, wherein the control circuit is configured to control the first transmit channel and the second transmit channel such that respective concurrent FMCW radar chirps of the first sequence of FMCW radar chirps and the second sequence of FMCW radar chirps have a same start frequency and a same stop frequency.

6. The MIMO radar apparatus of claim 1, wherein the control circuit is configured to assign, to the first transmit channel, a unique sequence of phases applied to the first sequence of FMCW radar chirps, and wherein the control circuit is configured to assign, to the second transmit channel, a unique sequence of phases applied to the second sequence of FMCW radar chirps.

7. The MIMO radar apparatus of claim 1, wherein the control circuit is configured to select the phases for the predefined Doppler division multiplex scheme from an M-ary phase modulation alphabet, wherein $M \geq 2$ is an integer.

8. The MIMO radar apparatus of claim 1, wherein the control circuit is configured to:
assign a first phase to the first sequence of FMCW radar chirps, and assign the first phase and a second phase to the second sequence of FMCW radar chirps, wherein concurrently transmitted FMCW radar chirps of the first sequence of FMCW radar chirps and second sequence of FMCW radar chirps have predetermined phase differences, wherein the predetermined phase differences comprise a first predetermined phase difference and a second predetermined phase difference.

9. The MIMO radar apparatus of claim 8, wherein the first predetermined phase difference is 0° and the second predetermined phase difference is 180°.

10. The MIMO radar apparatus of claim 8, wherein the control circuit is configured to assign, while two consecutive FMCW radar chirps of the first sequence of FMCW radar chirps are transmitted with the first phase, the first phase to a first FMCW radar chirp of the second sequence of FMCW radar chirps and the second phase to a subsequent second FMCW radar chirp of the second sequence of FMCW radar chirps.

11. The MIMO radar apparatus of claim 1, wherein the control circuit is configured to:

assign a sequence of first phases to the first sequence of FMCW radar chirps, wherein the sequence of first phases comprises either a first phase value or a second phase value, wherein the first phase value and the second phase value differ by 180°, and assign a sequence of second phases to the second sequence of FMCW radar chirps, wherein the sequence of second phases comprises either a third phase value or a fourth phase value, wherein the third phase value and the fourth phase value differ by 180°.

12. The MIMO radar apparatus of claim 11, wherein at least one of the first phase value and the second phase value are different from each of the third phase value and the fourth phase value, or at least one of the first phase value or the second phase value is the same as the third phase value.

13. The MIMO radar apparatus of claim 1, wherein the transmitter circuit comprises a third transmit channel, of the plurality of transmit channels, and is configured to transmit, via the third transmit channel, a third sequence of FMCW radar chirps such that at least one of a start frequency or a stop frequency of each of at least a portion of the third sequence of FMCW radar chirps are different from each other, and wherein the control circuit is configured to:

assign, to the first transmit channel, a first phase applied to each FMCW radar chirp of the first sequence of FMCW radar chirps, assign, to the second transmit channel, a sequence of second phases applied to the FMCW radar chirps of the second sequence of FMCW radar chirps, wherein the sequence of second phases comprises the first phase and a second phase in a temporal order specific for the second transmit channel, and assign, to the third transmit channel, a sequence of third phases applied to the third sequence of FMCW radar chirps, wherein the sequence of third phases comprises the first phase and the second phase in a temporal order specific for the third transmit channel.

14. The MIMO radar apparatus of claim 13, wherein the control circuit is configured to, while two consecutive FMCW radar chirps of the first sequence of FMCW radar chirps are transmitted with the first phase, assign the first phase to a first FMCW radar chirp of the second sequence of FMCW radar chirps and assign the second phase to a subsequent second FMCW radar chirp of the second sequence of FMCW radar chirps, and while four consecutive FMCW radar chirps of the first sequence of FMCW radar chirps are transmitted with the first phase, assign the first phase to two consecutive FMCW radar chirps of the third sequence of FMCW radar chirps followed by assigning the second phase to two further consecutive FMCW radar chirps of the third sequence of FMCW radar chirps.

15. The MIMO radar apparatus of claim 1, further comprising a receiver circuit comprising at least one receiver channel, wherein the at least one receiver channel is configured to receive a receive signal corresponding to reflections of the first sequence of FMCW radar chirps and the second sequence of FMCW radar chirps.

16. The MIMO radar apparatus of claim 15, wherein the receiver circuit is configured to:

perform a first fast Fourier transform (FFT) of the receive signal to generate a plurality of first bins;

perform a second FFT using the first bins to generate a plurality of second bins; and combine the plurality of first bins and the plurality of second bins to obtain a combined range Doppler-map for the plurality of transmit channels.

17. The MIMO radar apparatus of claim 16, wherein the receiver circuit is configured to identify each transmit channel, of the plurality of transmit channels, based on evaluating one or more of mutual distances or phase differences between a group of second bins associated with a same first bin of the combined range Doppler-map.

18. The MIMO radar apparatus of claim 16, wherein the receiver circuit is configured to identify a first one of the plurality of transmit channels based on a pair of second bins having a predetermined mutual bin distance and a predetermined phase difference associated with the predefined Doppler division multiplex scheme, and to identify at least a second one of the plurality of transmit channels based on amplitudes of remaining second bins associated with a same first bin.

19. The MIMO radar apparatus of claim 18, wherein the predetermined phase difference is 90°.

20. The MIMO radar apparatus of claim 1, wherein a start frequency is an initial frequency at which a respective FMCW radar chirp is transmitted, and a stop frequency is final frequency at which the respective FMCW radar chirp is transmitted.

21. The MIMO radar apparatus of claim 1, wherein the first sequence of FMCW radar chirps includes a first FMCW radar chirp and a second FMCW radar chirp, wherein the first FMCW radar chirp has a first start frequency and the second FMCW radar chirp has a second start frequency that is different from the first start frequency, or wherein the first FMCW radar chirp has a first stop frequency and the second FMCW radar chirp has a second stop frequency that is different from the first stop frequency, and wherein the second sequence of FMCW radar chirps includes a third FMCW radar chirp and a fourth FMCW radar chirp, wherein the third FMCW radar chirp has a third start frequency and the fourth FMCW radar chirp has a fourth start frequency that is different from the third start frequency, or wherein the third FMCW radar chirp has a third stop frequency and the fourth FMCW radar chirp has a fourth stop frequency that is different from the third stop frequency.

22. The MIMO radar apparatus of claim 21, wherein the transmitter circuit is configured to transmit the first FMCW radar chirp and the third FMCW radar chirp concurrently with a same respective start frequency and a same respective stop frequency, and wherein the transmitter circuit is configured to transmit the second FMCW radar chirp and the fourth FMCW radar chirp concurrently with a same respective start frequency and a same respective stop frequency.

23. The MIMO radar apparatus of claim 1, wherein the first sequence of FMCW radar chirps includes a first FMCW radar chirp and a second FMCW radar chirp, wherein the first FMCW radar chirp has a first start frequency and the second FMCW radar chirp has a second start frequency that is different from the first start frequency, and wherein the first FMCW radar chirp has a first stop frequency and the second FMCW radar chirp has a second stop frequency that is different from the first stop frequency, and wherein the second sequence of FMCW radar chirps includes a third FMCW radar chirp and a fourth FMCW radar chirp, wherein the third FMCW radar chirp has a third start frequency and the fourth FMCW radar chirp has a fourth start frequency that is different from the third start frequency, and wherein the third FMCW radar chirp has a third stop frequency and the fourth FMCW radar chirp has a fourth stop frequency that is different from the third stop frequency.

24. The MIMO radar apparatus of claim 1, wherein each FMCW radar chirp of the first sequence of FMCW radar chirps has a different start frequency or a different stop frequency among the first sequence of FMCW radar chirps, and wherein each FMCW radar chirp of the second sequence of FMCW radar chirps has a different start frequency or a different stop frequency among the second sequence of FMCW radar chirps.

25. A multi input multi output (MIMO) radar method, the MIMO radar method comprising:

transmitting, via a first transmit channel, a first sequence of FMCW radar chirps such that one or more of a start frequency or a stop frequency of each of at least a portion of the first sequence FMCW radar chirps are different from each other, transmitting, via a second transmit channel, a second sequence of FMCW radar chirps, wherein one or more of a start frequency or a stop frequency of each of at least a portion of the second sequence FMCW radar chirps are different from each other, wherein the first sequence of FMCW radar chirps and the second sequence of FMCW radar chirps are transmitted concurrently; and controlling the first transmit channel and the second transmit channel to set phases of the first sequence of FMCW radar chirps and phases of the second sequence of FMCW radar chirps in accordance with a predefined Doppler division multiplex scheme.

\* \* \* \* \*